United States Patent
Sugawara

(10) Patent No.: US 12,098,768 B2
(45) Date of Patent: Sep. 24, 2024

(54) ROTARY SHIFTER

(71) Applicant: ALPS ALPINE CO., LTD., Tokyo (JP)

(72) Inventor: Daisaku Sugawara, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/458,530

(22) Filed: Aug. 30, 2023

(65) Prior Publication Data

US 2023/0407959 A1    Dec. 21, 2023

Related U.S. Application Data

(63) Continuation of application No. PCT/JP2022/010135, filed on Mar. 8, 2022.

(30) Foreign Application Priority Data

Mar. 25, 2021    (JP) ................................ 2021-052132

(51) Int. Cl.
F16H 59/08    (2006.01)

(52) U.S. Cl.
CPC ....... F16H 59/08 (2013.01); *F16H 2059/081* (2013.01)

(58) Field of Classification Search
CPC ............................. F16H 59/08; F16H 2059/081
USPC .......................................................... 74/335
See application file for complete search history.

(56) References Cited

U.S. PATENT DOCUMENTS

| | | | | |
|---|---|---|---|---|
| 7,214,894 B1 * | 5/2007 | Kakuno | ................. | H01H 25/04 345/157 |
| 7,242,390 B2 * | 7/2007 | Bader | ................. | H01H 25/002 345/184 |
| 7,368,673 B2 * | 5/2008 | Sato | ....................... | H01H 25/04 200/5 R |

(Continued)

FOREIGN PATENT DOCUMENTS

| | | |
|---|---|---|
| EP | 2161644 | 3/2010 |
| JP | 2010-062075 | 3/2010 |

(Continued)

OTHER PUBLICATIONS

International Search Report for PCT/JP2022/010135 mailed on Apr. 26, 2022.

*Primary Examiner* — Ha Dinh Ho
(74) *Attorney, Agent, or Firm* — IPUSA, PLLC

(57) ABSTRACT

A rotary shifter includes a knob, a cam mechanism to hold the knob at holding positions corresponding to respective predetermined shift positions whose number is N, an electromagnetic brake including a yoke and an armature to restrict the rotation of the armature and the knob, and a hardware processor to determine a predetermined shift position of the knob to control the operation of the electromagnetic brake. The rotation pitch angle between the holding positions of the knob at the time of switching the predetermined shift positions is set to an angle obtained by dividing 360 degrees by a first integer A (A≥N). The rotation pitch angle between stopping positions of the armature corresponding to the holding positions at the time of switching the predetermined shift positions is set to an angle obtained by dividing 360 degrees by a second integer B (A>B≥N).

11 Claims, 17 Drawing Sheets

(56) References Cited

U.S. PATENT DOCUMENTS

| | | | | |
|---|---|---|---|---|
| 7,579,559 B2* | 8/2009 | Schelbert | ............... | G05G 5/065 |
| | | | | 200/61.54 |
| 8,884,933 B2* | 11/2014 | Yokoyama | ............... | G05G 1/02 |
| | | | | 345/184 |
| 11,162,579 B2* | 11/2021 | Park | ........................ | F16H 59/08 |
| 2009/0008233 A1* | 1/2009 | Saomoto | .................. | G05G 5/05 |
| | | | | 200/6 A |
| 2012/0056761 A1 | 3/2012 | Sano | | |
| 2013/0199881 A1 | 8/2013 | Sano | | |
| 2018/0372216 A1 | 12/2018 | Yamanaka et al. | | |
| 2020/0166122 A1* | 5/2020 | Yamamoto | ............... | F16H 63/34 |

FOREIGN PATENT DOCUMENTS

| | | |
|---|---|---|
| JP | 2012-079295 | 4/2012 |
| JP | 2013-160356 | 8/2013 |
| JP | 2020-530145 | 10/2020 |

\* cited by examiner

FIG.13

| | NUMBER OF SHIFT POSITIONS (N) | ROTATION PITCH ANGLE BETWEEN KNOB HOLDING POSITIONS (θ1) | ROTATION ANGLE OF KNOB OPERATION (θ2) | NUMBER OF HOLDING POSITIONS PER ONE TURN OF KNOB (FIRST INTEGER A) | NUMBER OF STOP POSITIONS PER ONE TURN OF ARMATURE (SECOND INTEGER B) | SPEED INCREASE RATE (A÷B) | KNOB DIAMETER (d) |
|---|---|---|---|---|---|---|---|
| FIRST EXAMPLE | 5 | 20° | 80° | 18 | 5, 6, 8, 9 | 3.6, 3, 2.25, 2 | 45 mm OR MORE |
| SECOND EXAMPLE | 5 | 22.5° | 90° | 16 | 5, 8 | 3.2, 2 | 45 mm OR MORE |
| THIRD EXAMPLE | 4 | 20° | 60° | 18 | 5, 6, 8, 9 | 3.6, 3, 2.25, 2 | 45 mm OR MORE |
| FOURTH EXAMPLE | 4 | 22.5° | 67.5° | 16 | 4, 5, 8 | 4, 3.2, 2 | 45 mm OR MORE |
| FIFTH EXAMPLE | 4 | 24° | 72° | 15 | 4, 5, 6 | 3.75, 3, 2.5 | 45 mm OR MORE |
| SIXTH EXAMPLE | 4 | 30° | 90° | 12 | 4, 5, 6 | 3, 2.4, 2 | 45 mm OR MORE |

ROTARY SHIFTER

CROSS-REFERENCE TO RELATED APPLICATIONS

This application is a continuation application of International Application No. PCT/JP2022/010135, filed on Mar. 8, 2022, and designated the U.S., which is based upon and claims priority to Japanese Patent Application No. 2021-052132, filed on Mar. 25, 2021, the entire contents of which are incorporated herein by reference.

BACKGROUND

1. Field of the Invention

The present disclosure relates to a rotary shifter.

2. Description of the Related Art

For example, as an operating device used for a rotary shifter or the like for performing shift change in a transmission mounted on a vehicle such as an automobile, there has been used a rotary input device capable of performing rotary operation by a knob providing a sense of moderation and having a holding mechanism for holding the knob at holding positions corresponding to respective shift positions.

For such a rotary input device, there has been disclosed a technique for controlling operation of an electromagnetic brake capable of restricting rotation of the knob by determining the shift position at which the knob is held by detecting a rotation angle of the armature that rotates with the rotation of the knob, and attracting the armature using a magnetic force in accordance with the shift position at which the knob is held (see, for example, Japanese Laid-Open Patent Application Nos. 2020-530145, 2012-079295, and 2010-062075).

SUMMARY

A rotary shifter includes a knob, a cam mechanism to hold the knob at holding positions corresponding to respective predetermined shift positions whose number is N, an electromagnetic brake including a yoke and an armature to restrict the rotation of the armature and the knob, and a hardware processor to determine a predetermined shift position of the knob to control the operation of the electromagnetic brake. The rotation pitch angle between the holding positions of the knob at the time of switching the predetermined shift positions is set to an angle obtained by dividing 360 degrees by a first integer A (A≥N). The rotation pitch angle between stopping positions of the armature corresponding to the holding positions at the time of switching the predetermined shift positions is set to an angle obtained by dividing 360 degrees by a second integer B (A>B≥N).

BRIEF DESCRIPTION OF THE DRAWINGS

FIG. 13 is a diagram illustrating various implementation conditions of each example of the rotary input device according to the embodiment.

DESCRIPTION OF THE EMBODIMENT

Figure 1:
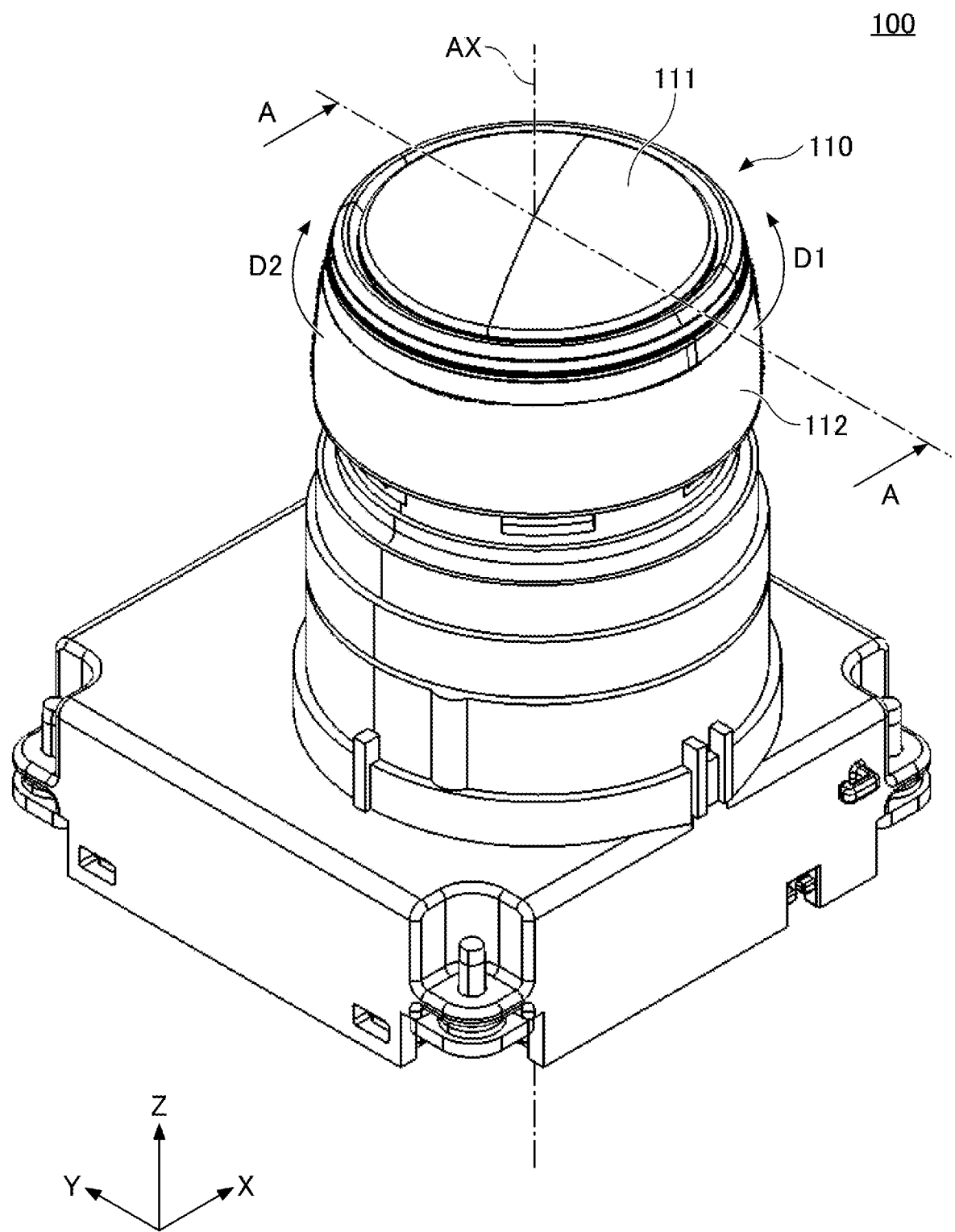
FIG. 1 is an external perspective view of a rotary input device according to an embodiment.

The inventors of the present disclosure have found that, when the relationship between the number of shift positions of the knob, the rotation pitch angle of the knob, and the rotation pitch angle of the armature is not appropriately set, various problems associated with the rotation operation of the knob may occur (for example, the operation feeling is different for each operation, the shift position cannot be accurately determined based on the rotation angle of the armature, the holding position is different before and after rotation when the knob is rotated once, and the like) in the related art.

Hereinafter, one embodiment will be described with reference to the drawings. Note that, in the following description, for the sake of convenience, a Z-axis direction in the drawings is referred to as an up-down direction, an X-axis direction in the drawings is referred to as a front-rear direction, and a Y-axis direction in the drawings is referred to as a left-right direction. In addition, an X-axis positive direction is referred to as a forward direction, a Y-axis positive direction is referred to as a rightward direction, and a Z-axis positive direction is referred to as an upward direction. These directions illustrate the relative positional relationship in a device, and do not limit the installation direction and the operation direction of the device. All of those having the same relative positional relationship in the device and those having different installation directions and operation directions are included in the scope of the present disclosure.

(Overview of Rotary Input Device 100)

Figure 2:
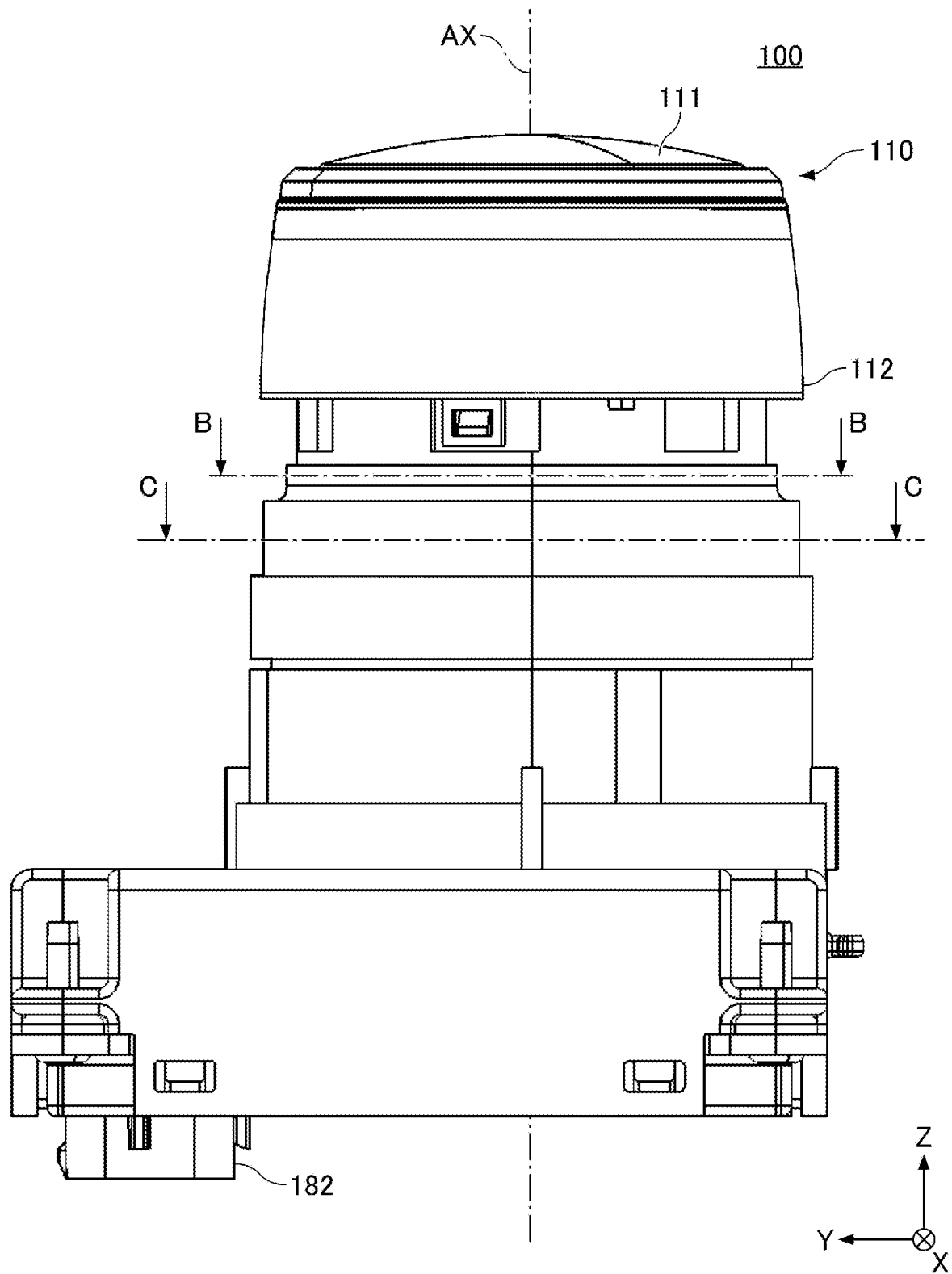
FIG. 2 is a side view of the rotary input device according to the embodiment.

FIG. 1 is an external perspective view of a rotary input device 100 according to one embodiment. FIG. 2 is a side view of the rotary input device 100 according to the embodiment.

The rotary input device 100 illustrated in FIG. 1 is installed in the vicinity of a driver's seat in a vehicle such as an automobile. The rotary input device 100 is a so-called "rotary shifter" and is rotationally operated by a driver of the vehicle to perform shift change of a transmission mounted on the vehicle. The rotary input device 100 outputs a control signal corresponding to an operation by the driver to the outside to electrically control the transmission of the vehicle. That is, the rotary input device 100 adopts a so-called shift-by-wire system.

The rotary input device 100 may also be used for purposes other than the shift change of the transmission of the vehicle. For example, the rotary input device 100 may be used in a device other than an automobile (for example, an aircraft, a railway vehicle, a game machine, a remote controller, or the like). Although the rotary input device 100 has an electrical configuration for outputting an electrical signal corresponding to shift operation, illustration and description of the electrical configuration will be omitted in the present embodiment.

As illustrated in FIG. 1, a cylindrical knob 110 that can be rotationally operated is provided at the uppermost portion of the rotary input device 100. The outer peripheral side surface of the knob 110 is a cylindrical dial portion 112 which is a separate member from an upper surface 111 of the knob 110. The upper surface 111 does not rotate. On the other hand, the dial portion 112 is an example of a "knob that can be rotationally operated", and in a plan view from above (the Z-axis positive direction), it is rotatable about a rotation center axis AX in the counterclockwise direction (an arrow D1 direction illustrated in FIG. 1) and the clockwise direction (an arrow D2 direction illustrated in FIG. 1). The driver of the vehicle can switch shift positions of the transmission mounted on the vehicle between shift positions (for example, "P" (parking), "R" (reverse), "N" (neutral), "D" (drive), and the like) by rotating the dial portion 112.

The rotary input device 100 can switch the shift positions of the transmission every time the dial portion 112 rotates by a predetermined angle, and can stop and hold the dial portion 112 at holding positions corresponding to respective predetermined shift positions by a cam mechanism 100B (see FIG. 7) to restrict the rotation of the dial portion 112. Furthermore, the rotary input device 100 can provide a click feeling to the driver of the vehicle by the cam mechanism 100B every time the dial portion 112 rotates by the predetermined angle. Accordingly, the rotary input device 100 allows the driver of the vehicle to have a haptic feedback to recognize that the shift position switching has been reliably performed. The rotary input device 100 can also brake the rotation of the dial portion 112 by an electromagnetic brake unit 190. Thus, the rotary input device 100 can prevent the shift position switching from being unintentionally performed by the driver of the vehicle.

(Configuration of Rotary Input Device 100)

Figure 3:
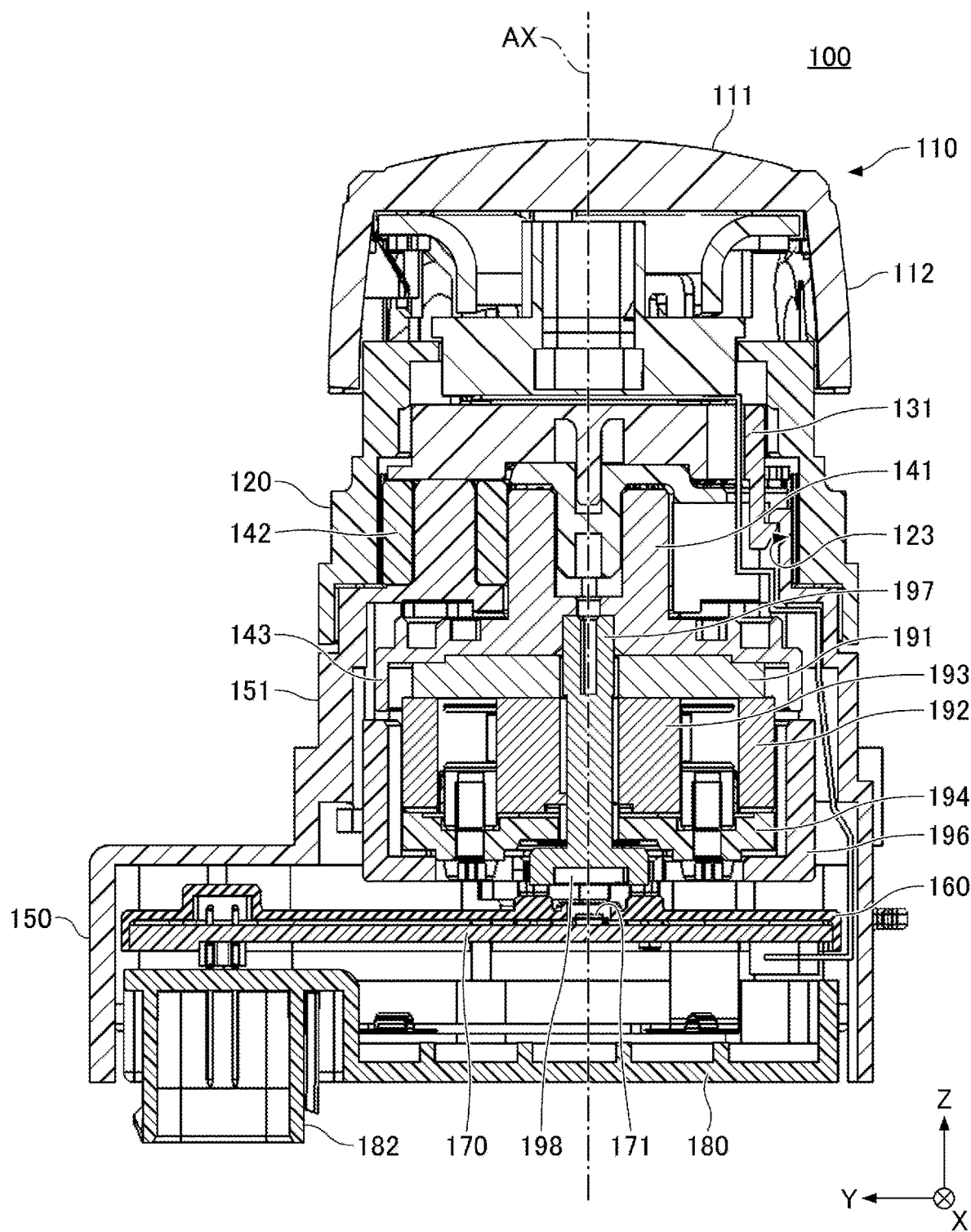
FIG. 3 is a cross-sectional view taken along the line A-A of the rotary input device according to the embodiment.
Figure 4:
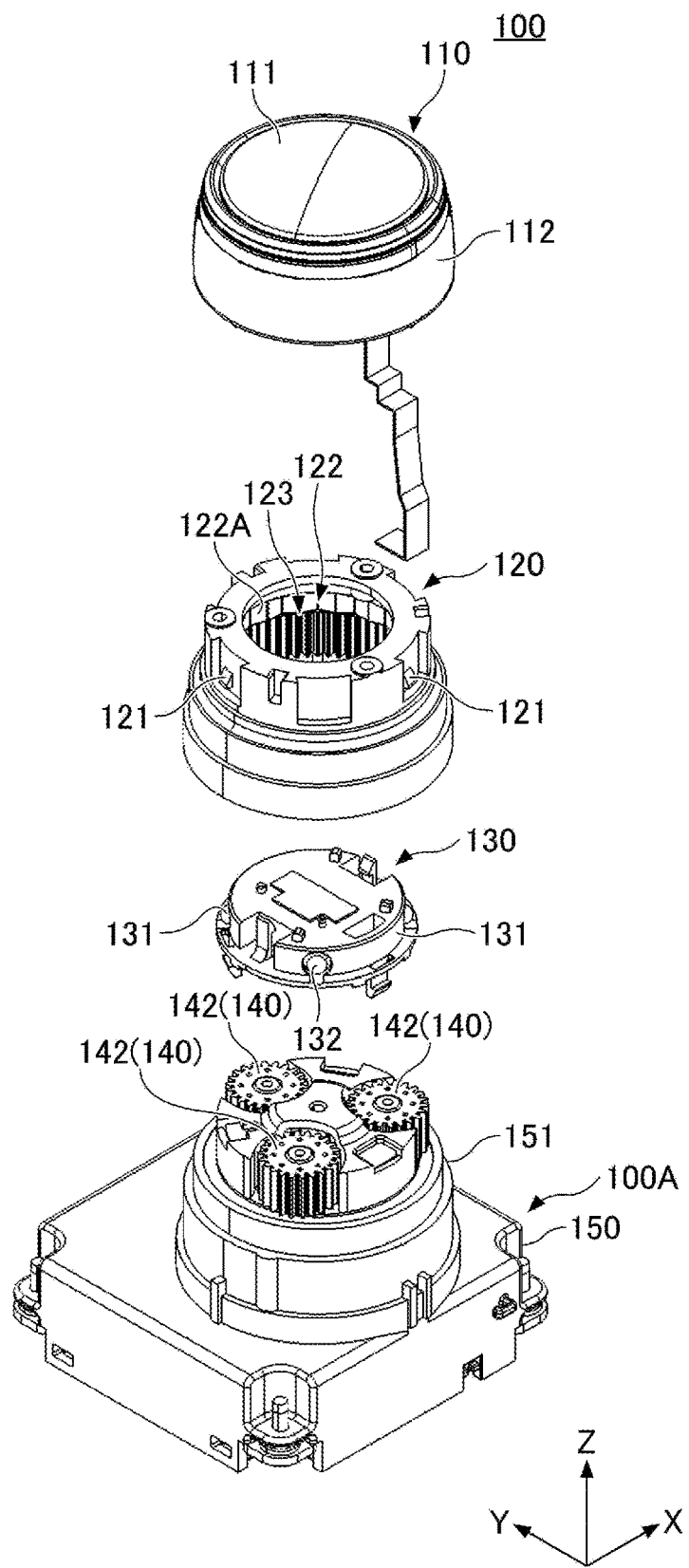
FIG. 4 is an exploded perspective view seen from above of the rotary input device according to the embodiment.
Figure 5:
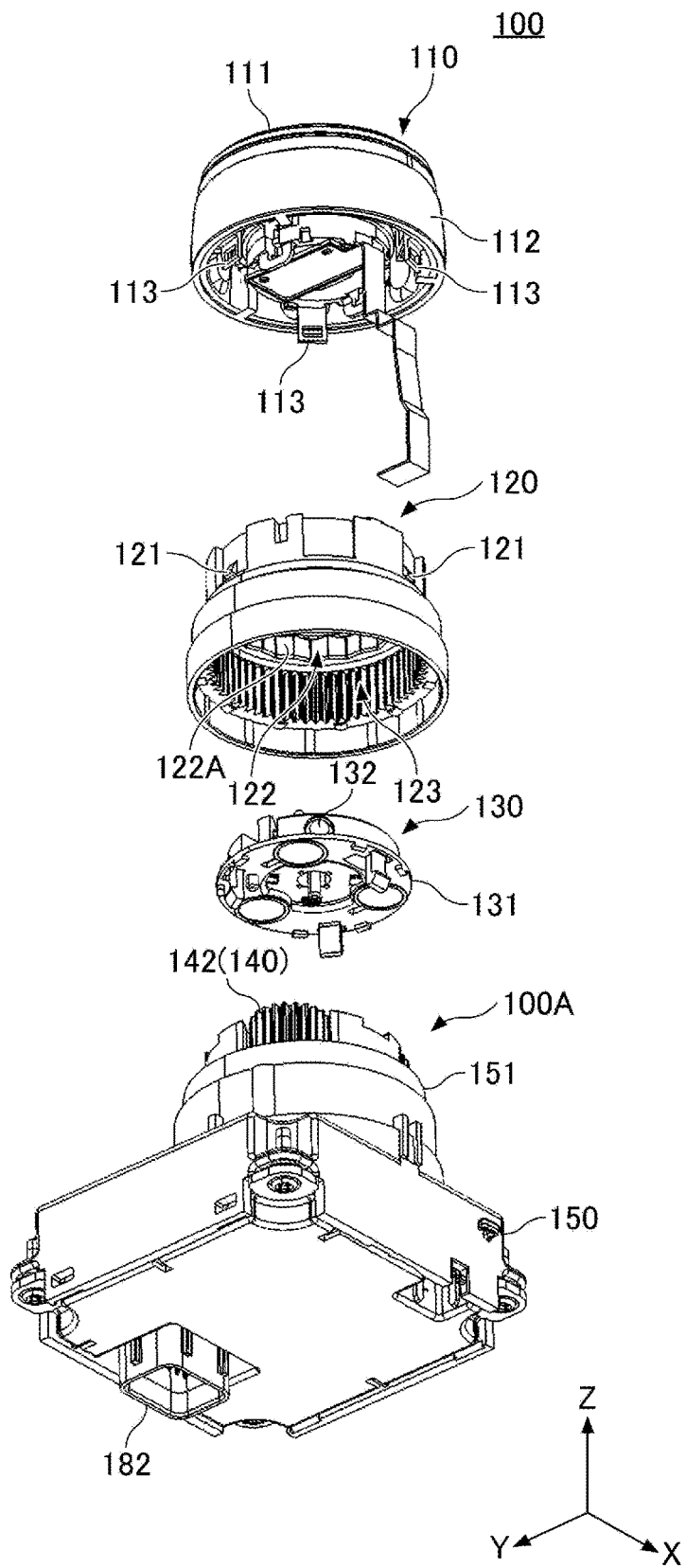
FIG. 5 is an exploded perspective view of the rotary input device according to the embodiment as viewed from below.

FIG. 3 is a cross-sectional view of the rotary input device 100 according to the embodiment taken along the line A-A (see FIG. 1). FIG. 4 is an exploded perspective view of the rotary input device 100 according to the embodiment as viewed from above. FIG. 5 is an exploded perspective view of the rotary input device 100 according to the embodiment as viewed from below.

As illustrated in FIG. 3 to FIG. 5, the rotary input device 100 includes the knob 110, a rotary cylindrical body 120, a cam unit 130, and a main body 100A.

As described above, the knob 110 is a resin columnar (specifically, cylindrical with a closed upper portion) member having the upper surface 111 and the dial portion 112. On the inner peripheral surface of the dial portion 112, hooks 113 are provided integrally with the dial portion 112 along the inner peripheral surface. Each of the plurality of hooks 113 is provided so as to protrude downward from the inner circumferential surface of the dial portion 112, and engages with a corresponding one of claw portions 121 included in the rotary cylindrical body 120.

The rotary cylindrical body 120 is a substantially cylindrical resin member disposed below the knob 110. A frame portion 151 of a case 150 included in the main body 100A is inserted into the cylinder of the rotary cylindrical body 120 from the lower opening of the rotary cylindrical body 120. The rotary cylindrical body 120 is pivotally supported by the frame portion 151.

The plurality of claw portions 121 are formed along the outer peripheral surface of the upper portion of the rotary cylindrical body 120. Each of the plurality of hooks 113 provided on the dial portion 112 engages with a corresponding claw portion 121. Thus, the rotary cylindrical body 120 is fixed to the dial portion 112 at the upper portion thereof, and rotates integrally with the dial portion 112 when a rotation operation is performed on the dial portion 112.

On the inner circumferential surface of the rotary cylindrical body 120, a cam surface 122 is formed over the entire circumference of the inner circumferential surface. The cam surface 122 has a configuration in which cam ridges 122A are continuously arranged.

An internal gear 123 is formed on the lower side of the cam surface 122 on the inner circumferential surface of the rotary cylindrical body 120 over the entire circumference of the inner circumferential surface. The internal gear 123 meshes with each of three planetary gears 142 included in a planetary gear mechanism 140 provided at the uppermost portion of the frame portion 151 of the case 150. Accordingly, the rotary cylindrical body 120 can cause each of the three planetary gears 142 to rotate as the rotary cylindrical body 120 itself rotates. That is, the internal gear 123 can transmit the rotation of the dial portion 112 and the rotary cylindrical body 120 to the planetary gear mechanism 140.

The cam unit 130 includes a holder 131 and contact members 132. The holder 131 is a thin cylindrical resin member and holds the plurality of contact members 132 therein. Each of the plurality of contact members 132 has a cylindrical shape whose tip end portion is formed in a hemispherical shape, and a part of the hemispherical tip end portion protrudes outward from the outer peripheral side surface of the holder 131. The cam unit 130 is fixed to the uppermost portion of the frame portion 151 of the case 150, and is disposed on the inner side of the cam surface 122 of the rotary cylindrical body 120 by inserting the frame portion 151 into the cylindrical body 120. The cam unit 130 constitutes a "cam mechanism 100B" together with the cam surface 122. The cam unit 130 can stop and hold the rotation of the dial portion 112 at a predetermined holding position and provide a click feeling in response to the rotation operation of the dial portion 112 by each of the plurality of contact members 132 coming into contact with and sliding on the cam surface 122. Details of the "cam mechanism 100B" will be described later with reference to FIG. 7.

(Configuration of Main Body 100A)

Figure 6:
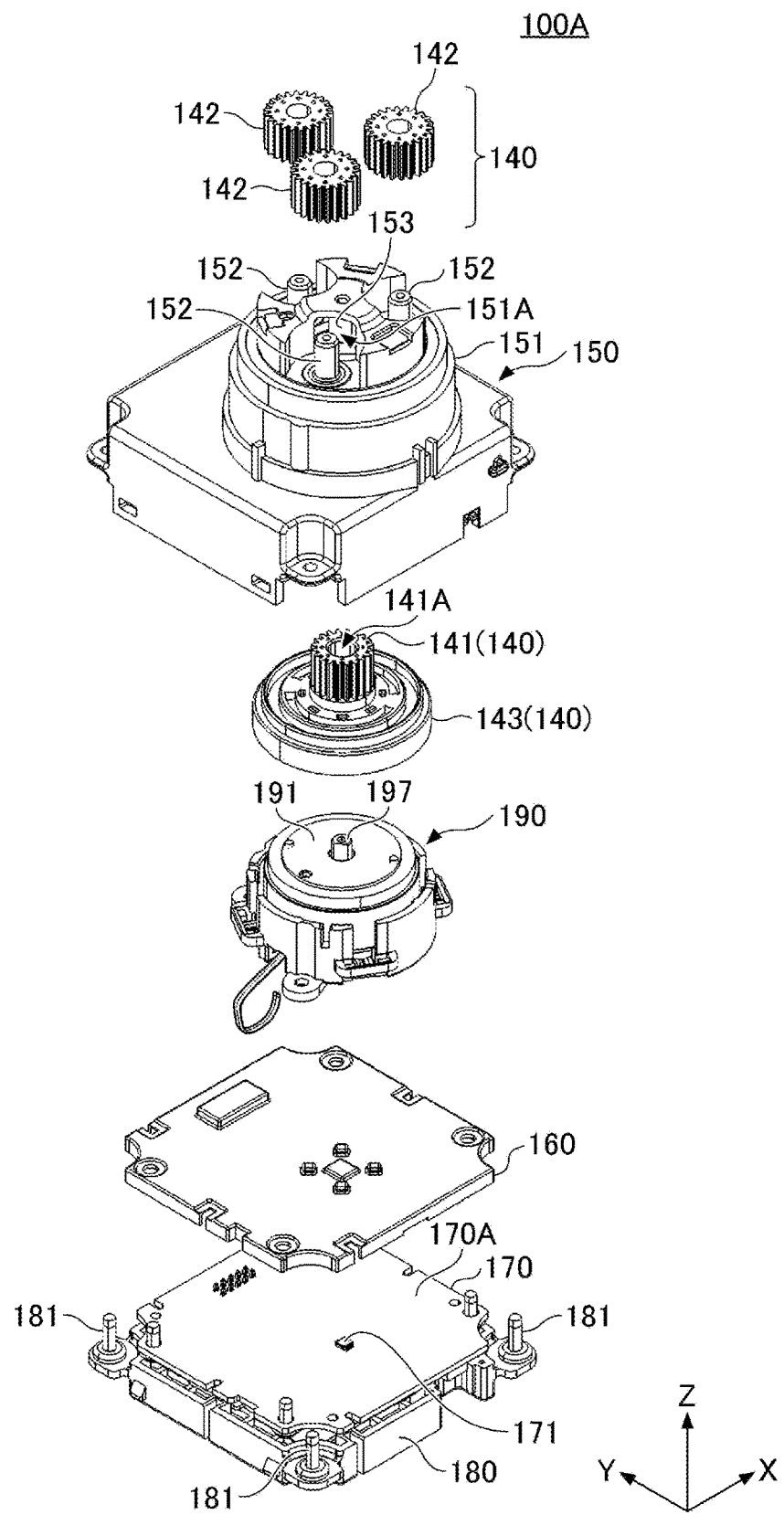
FIG. 6 is an exploded perspective view of a main body included in the rotary input device according to the embodiment.

The configuration of the main body 100A will be described with reference to FIG. 6. FIG. 6 is an exploded perspective view of the main body 100A included in the rotary input device 100 according to the embodiment. As illustrated in FIG. 6, the main body 100A includes the case 150, the planetary gear mechanism 140, the electromagnetic brake unit 190, a rubber sheet 160, a substrate 170, and a cover 180.

The case 150 is a substantially rectangular parallelepiped resin box-shaped member. The substantially cylindrical frame portion 151 is integrally provided at the upper portion of the case 150. As described above, the frame portion 151 is inserted into the cylinder of the rotary cylindrical body 120 from the lower opening of the rotary cylindrical body 120. A sun gear 141 included in the planetary gear mechanism 140 and the electromagnetic brake unit 190 are disposed in the cylinder of the frame portion 151. Three support shafts 152 stand on the upper surface of the frame portion 151. The three support shafts 152 pivotally support the respective three planetary gears 142 included in the planetary gear mechanism 140. Furthermore, a support shaft 153 is provided so as to hang down from the center (on the rotation center axis AX) of the ceiling surface in the cylinder of the frame portion 151. The support shaft 153 pivotally supports the sun gear 141 included in the planetary gear mechanism 140.

The planetary gear mechanism 140 transmits the rotation of the rotary cylindrical body 120 to the electromagnetic brake unit 190. The planetary gear mechanism 140 includes the internal gear 123 formed on the inner circumferential surface of the rotary cylindrical body 120, the sun gear 141, the three planetary gears 142, and a sun gear base 143. The sun gear 141 is disposed on the rotation center axis AX and at the upper end portion in the cylinder of the frame portion 151 of the case 150. The three planetary gears 142 are disposed at equal intervals (intervals of 120 degrees) around the sun gear 141 (on the same circumference centered on the rotation center axis AX). Each of the three planetary gears 142 is pivotally (rotatably) supported by the corresponding support shaft 152 that is provided so as to protrude upward from the upper surface of the frame portion 151 of the case 150. Thereby, each of the three planetary gears 142 rotates around the sun gear 141 but does not revolve therearound. Thus, in the planetary gear mechanism 140, a wiring member such as a flexible printed circuit (FPC) or the like can be arranged between two adjacent planetary gears 142. Each of the three planetary gears 142 meshes with the sun gear 141 in the frame portion 151 of the case 150 via an opening 151A formed in a wall portion between the planetary gears 142 and the sun gear 141. When the frame portion 151 of the case 150 is inserted into the rotary cylindrical body 120, each of the three planetary gears 142 meshes with the internal gear 123 formed on the inner peripheral surface of the rotary cylindrical body 120. Accordingly, each of the three planetary gears 142 rotates in place together with the internal gear 123 formed on the inner peripheral surface of the rotary cylindrical body 120, and the rotation of the internal gear 123 is transmitted to the sun gear 141 having a smaller number of teeth than the internal gear 123, thereby increasing the speed of the rotation of the rotary cylindrical body 120 to rotate the sun gear 141. The sun gear base 143 is provided on the lower side of the sun gear 141, and has a larger diameter than the sun gear 141 and an armature 191 included in the electromagnetic brake unit 190. The sun gear base 143 is also a thin tubular member having a closed upper portion, is formed integrally with the sun gear 141, and rotates integrally with the sun gear 141. The armature 191 is disposed in the cylinder of the sun gear base 143, and screwed and fixed. Thus, the sun gear base 143 rotates integrally with the armature 191. A through hole 141A is formed at the center of the sun gear 141 and the sun gear base 143 in the vertical direction of the sun gear 141. The support shaft 153 is inserted as a rotation center shaft from the upper side of the through hole 141A. From the lower side of the through hole 141A, the upper end portion of a rotating shaft member 197 included in the electromagnetic brake unit 190 is spline-coupled, that is, fitted with freedom of rotation in the axial direction and with rotation restriction in the rotational direction due to the shape. Accordingly, the sun gear 141 rotates integrally with the rotating shaft member 197 in a state where the attraction between the armature 191 and a yoke 192 is not disturbed.

The electromagnetic brake unit 190 is disposed below the sun gear base 143 of the planetary gear mechanism 140 in the cylinder of the frame portion 151 of the case 150. The electromagnetic brake unit 190 is a device capable of braking the rotation of the dial portion 112. Specifically, the electromagnetic brake unit 190 has, at its uppermost portion, the armature 191. The armature 191 is screwed and fixed to the ceiling surface in the cylinder of the sun gear base 143 of the planetary gear mechanism 140. Accordingly, the armature 191 rotates together with the rotary cylindrical body 120, the three planetary gears 142, the sun gear 141, and the sun gear base 143 about the rotation center axis AX as the dial portion 112 rotates. The electromagnetic brake unit 190 can brake the rotation of the rotary cylindrical body 120, the three planetary gears 142, the sun gear 141, the sun gear base 143, and the dial portion 112 by braking the rotation of the armature 191 with an electromagnetic brake 190A. The detailed configuration of the electromagnetic brake unit 190 will be described later with reference to FIG. 10 and FIG. 11.

For example, when a predetermined lock condition is satisfied, the electromagnetic brake unit 190 activates the electromagnetic brake 190A to brake the rotation of the armature 191, thereby disabling the rotation operation of the dial portion 112. Thus, when the predetermined lock condition is satisfied, the electromagnetic brake unit 190 can prevent unintended and inappropriate shift position switching. The predetermined lock condition is, for example, when the shift position is set to "P" and the brake pedal is not depressed, or when the rotation operation for switching the shift position to "R" is performed in a state where the vehicle is moving forward, or the like.

The rubber sheet 160 is a sheet member provided to overlap the upper surface 170A of the substrate 170. The rubber sheet 160 is formed of an elastic material (for example, silicon rubber or the like). Since the rubber sheet 160 covers the entire upper surface 170A of the substrate 170, the upper surface 170A of the substrate 170 can be prevented from being covered with water even when water intrudes inside the case 150.

The substrate 170 is a flat plate component, and has a quadrangular shape in a plan view. Inside the case 150, the substrate 170 is fixedly installed horizontally with respect to the XY plane on the upper surface of the cover 180. A printed wiring board (PWB) is used for the substrate 170, for example. A magnetic rotation angle detection sensor 171 as an example of a "rotation angle detection unit" is mounted on the upper surface 170A of the substrate 170. The rotation angle detection sensor 171 is provided at a position immediately below the rotating shaft member 197 of the electromagnetic brake unit 190, and faces a magnet 198 provided on the lower end surface of the rotating shaft member 197. The rotation angle detection sensor 171 can detect the rotation angle of the rotating shaft member 197 by detecting a change in the magnetic flux direction caused by the rotation of the magnet 198. The rotation angle detection sensor 171 can output a rotation angle signal indicating the detected rotation angle to a control device 200 via a connector 182 provided in the cover 180. Since the rotating shaft member 197 rotates integrally with the sun gear 141 and the armature 191, the rotation angle of the rotating shaft member 197 detected by the rotation angle detection sensor 171 is also the rotation angle of the sun gear 141 and the armature 191. The control device 200 can calculate the rotation angle of the rotary cylindrical body 120 using a gear ratio corresponding to the number of teeth of the internal gear 123 of the rotary cylindrical body 120 and the number of teeth of the sun gear 141. The calculated rotation angle of the rotary cylindrical body 120 is detected as a rotation angle of the rotation operation performed by the dial portion 112 that rotates integrally with the rotary cylindrical body 120, and is used for the purpose of outputting a shift position switching signal, the purpose of controlling the operation of the electromagnetic brake unit 190, or the like in accordance with the detection result. The rotary input device 100 according to the embodiment uses the magnetic rotation angle detection sensor 171 (GMR sensor) as an example of a "sensor" for detecting a rotation angle. However, the present disclosure is not limited thereto, and the rotary input device 100 may use a sensor of another type (for example, an optical type, a mechanical type, an electrostatic type, a resistance type, or the like) as another example of the "sensor" for detecting the rotation angle.

The cover 180 is a resin and plate-shaped component that closes the lower opening of the case 150, and has a quadrangular shape in a plan view. The cover 180 is screwed and fixed to the case 150 by four screws 181 that each penetrates each of the four corners of the cover 180. On the bottom surface of the cover 180, the connector 182 (see FIG. 5) having a square tubular shape is provided so as to protrude downward. Inside the connector 182, connector pins (not illustrated) are disposed so as to hang downward from the lower surface of the substrate 170. When an external connector (not illustrated) is fitted into the connector 182, the connector 182 causes the plurality of connector pins to electrically connect to the external connector.

(Configuration of Cam Mechanism 100B)

Figure 7:
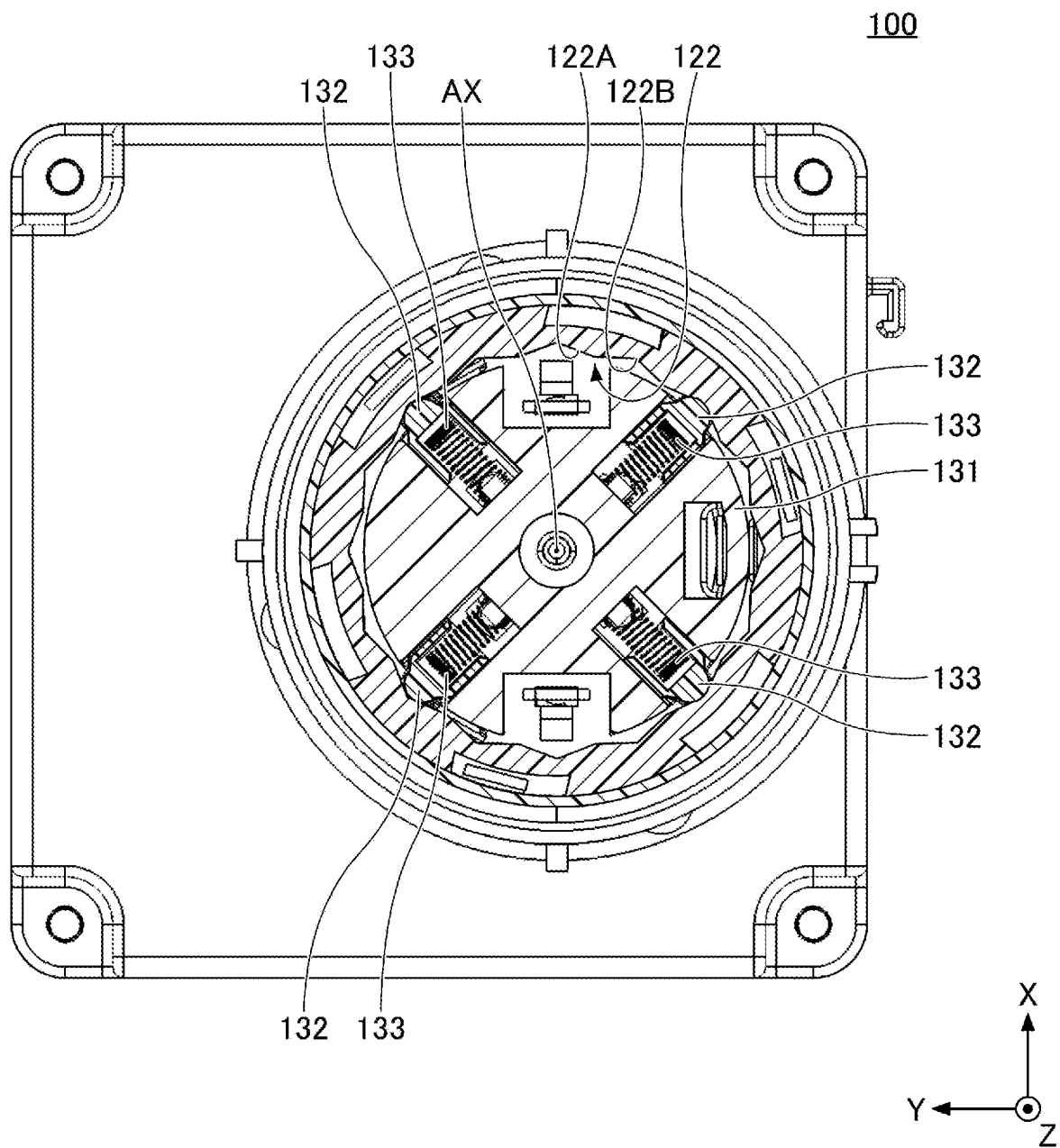
FIG. 7 is a cross-sectional view taken along the line B-B of the rotary input device according to the embodiment.

FIG. 7 is a cross-sectional view of the rotary input device 100 according to the embodiment taken along the line B-B (see FIG. 2). FIG. 7 illustrates a cross section of the rotary input device 100 at the height position of the cam surface 122 of the rotary cylindrical body 120 described above.

As illustrated in FIG. 7, the holder 131 having a circular shape in a plan view is disposed inside the cam surface 122 formed on the inner peripheral surface of the rotary cylindrical body 120. The four contact members 132 are arranged at intervals of 90 degrees on the inner side of the outer peripheral side surface of the holder 131. Each of the four contact members 132 has a cylindrical shape extending outward in the radial direction of the holder 131, and the tip end portion thereof is formed in a hemispherical shape. The hemispherical tip portion of the contact member 132 protrudes outward from the outer peripheral side surface of the holder 131. Each of the four contact members 132 is also biased outward in the radial direction by a coil spring 133. Accordingly, each of the four contact members 132 is pressed against the cam surface 122 of the rotary cylindrical body 120, thereby pressing the cam surface 122.

The rotary cylindrical body 120 rotates integrally with the dial portion 112. On the other hand, the holder 131 does not rotate since it is fixed to the frame portion 151 of the case 150. Each of the four contact members 132 slides along the cam surface 122 in accordance with the rotation of the dial portion 112 and the rotary cylindrical body 120. Each of the four contact members 132 is also movable in the radial direction of the frame portion 151 while sliding along the cam surface 122 and expanding and contracting the coil spring 133 in accordance with the rotation of the dial portion 112 and the rotary cylindrical body 120. Furthermore, each of the four contact members 132 is stopped and held at one of valley portions 122B, each of which is a holding position between the two adjacent cam ridges 122A, every time the dial portion 112 and the rotary cylindrical body 120 rotate by a predetermined angle.

Each contact member 132 is gradually pressed in the direction of the rotation center axis AX by two adjacent cam ridges 122A from a state where the member 132 is held at a valley portion 122B which is the holding position between the two adjacent cam ridges 122A to a state where the contact member 132 reaches the top portion of the cam ridge 122A in the rotation direction side of the two adjacent cam ridges in accordance with the rotation of the rotary cylindrical body 120 and the dial portion 112. Accordingly, the load for returning the rotary cylindrical body 120 and the dial portion 112 in the opposite direction of the rotation gradually increases.

Once each contact member 132 passes the top of the cam ridge 122A in the rotational direction side of the two adjacent cam ridges 122A in accordance with the rotation of the rotary cylindrical body 120 and the dial portion 112, the contact member 132 moves outward in the radial direction by the elastic force of the coil spring 133. Each contact member 132 then slides into the next valley portion 122B while biasing the rotation of the rotary cylindrical body 120 and the dial portion 112 in the rotation direction via the cam ridge 122A. At this time, the load related to the rotation of the rotary cylindrical body 120 and the knob 110 is rapidly reduced. When each contact member 132 reaches the next valley portion 122B, the rotation of the rotary cylindrical body 120 is stopped, and the rotary cylindrical body 120 is held at that position.

The cam mechanism 100B can provide an operational feeling (so-called click feeling) in response to the rotation operation of the dial portion 112 by changing the rotational load applied to the rotary cylindrical body 120 and the dial portion 112 as described above. The cam mechanism 100B can also, when the rotation operation of the dial portion 112 is finished, rotationally drive the dial portion 112 to the valley portion 122B that is the holding position between the nearest two cam ridges 122A, and then hold the dial portion 112 at the nearest holding position.

(Configuration of Planetary Gear Mechanism 140)

Figure 8:
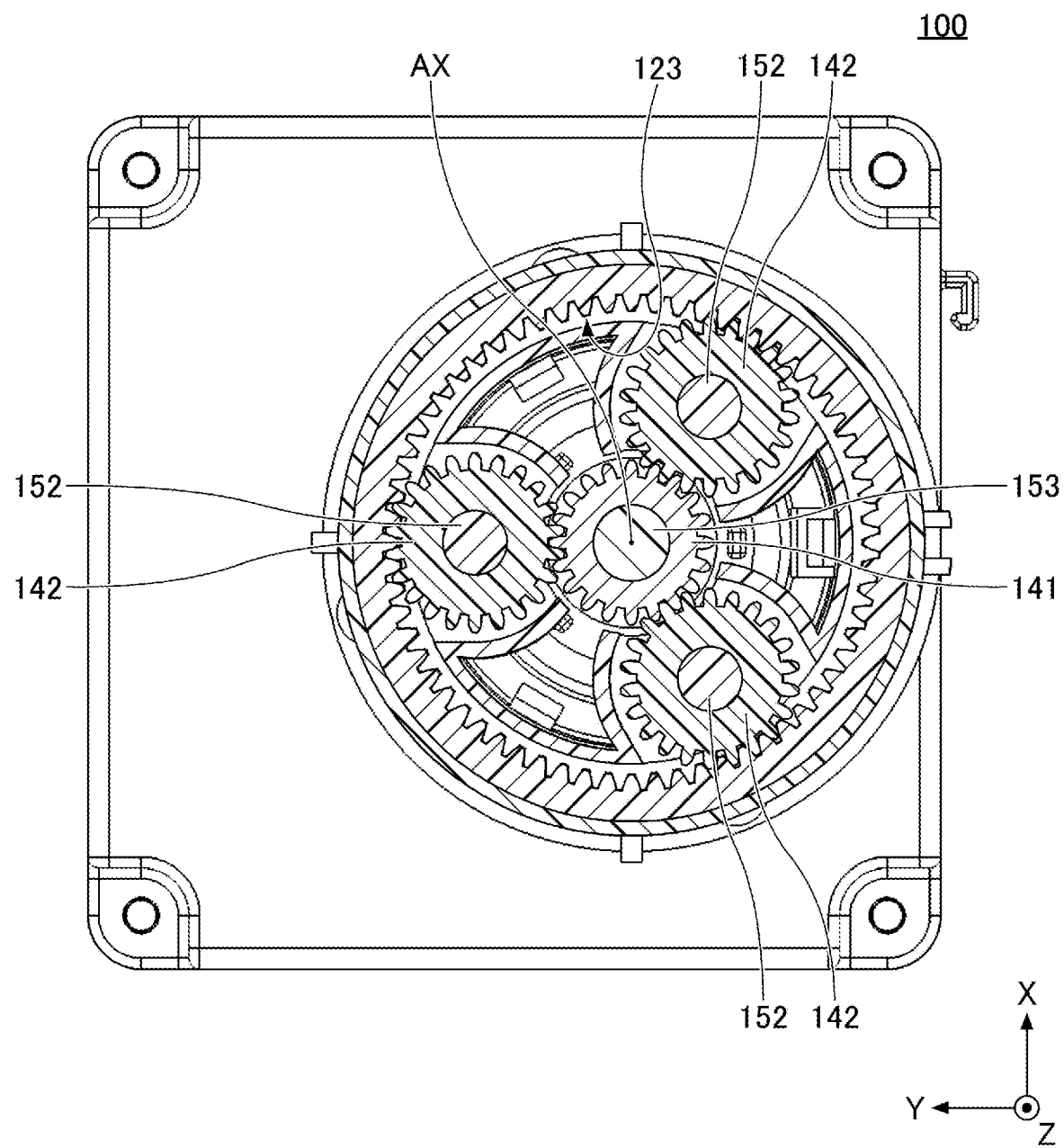
FIG. 8 is a cross-sectional view taken along the line C-C of the rotary input device according to the embodiment.

FIG. 8 is a cross-sectional view of the rotary input device 100 according to the embodiment taken along the line C-C (see FIG. 2). FIG. 8 illustrates a cross section of the rotary input device 100 at the height position of the internal gear 123 of the rotary cylindrical body 120 described above.

As illustrated in FIG. 8, the internal gear 123 formed on the inner circumferential surface of the rotary cylindrical body 120 meshes with each of the three planetary gears 142 included in the planetary gear mechanism 140. Accordingly, the internal gear 123 can rotate the sun gear 141 meshing with each of the three planetary gears 142 by rotating each of the three planetary gears 142 in place in accordance with the rotation by the rotation operation of the dial portion 112 and the rotary cylindrical body 120. Furthermore, when a braking force is applied to the rotation of the sun gear 141 by the electromagnetic brake unit 190, the internal gear 123 transmits the braking force to the rotary cylindrical body 120 so that the dial portion 112 and the rotary cylindrical body 120 do not rotate.

Here, as illustrated in FIG. 8, the number of teeth of the internal gear 123 is 64, which is larger than 20 which is the number of teeth of the sun gear 141. Thus, in the rotary input device 100 of the present embodiment, when a braking force is applied to the rotation of the sun gear 141 by the electromagnetic brake unit 190, the braking force can be amplified by 3.2 (=64÷20) times and transmitted to the rotary cylindrical body 120 and the dial portion 112. Furthermore, when the rotation operation is performed by the dial portion 112, the rotation angle of the rotation operation can be amplified to rotate the rotating shaft member 197 included in the electromagnetic brake unit 190. That is, in the rotary input device 100 according to the present embodiment, even when a rotation operation of a relatively small rotation angle is performed by the dial portion 112, the rotation angle detection sensor 171 mounted on the substrate 170 can more reliably detect that the rotation operation is performed, by amplifying the rotation angle.

(Electrical Configuration of Rotary Input Device 100)

Figure 9:
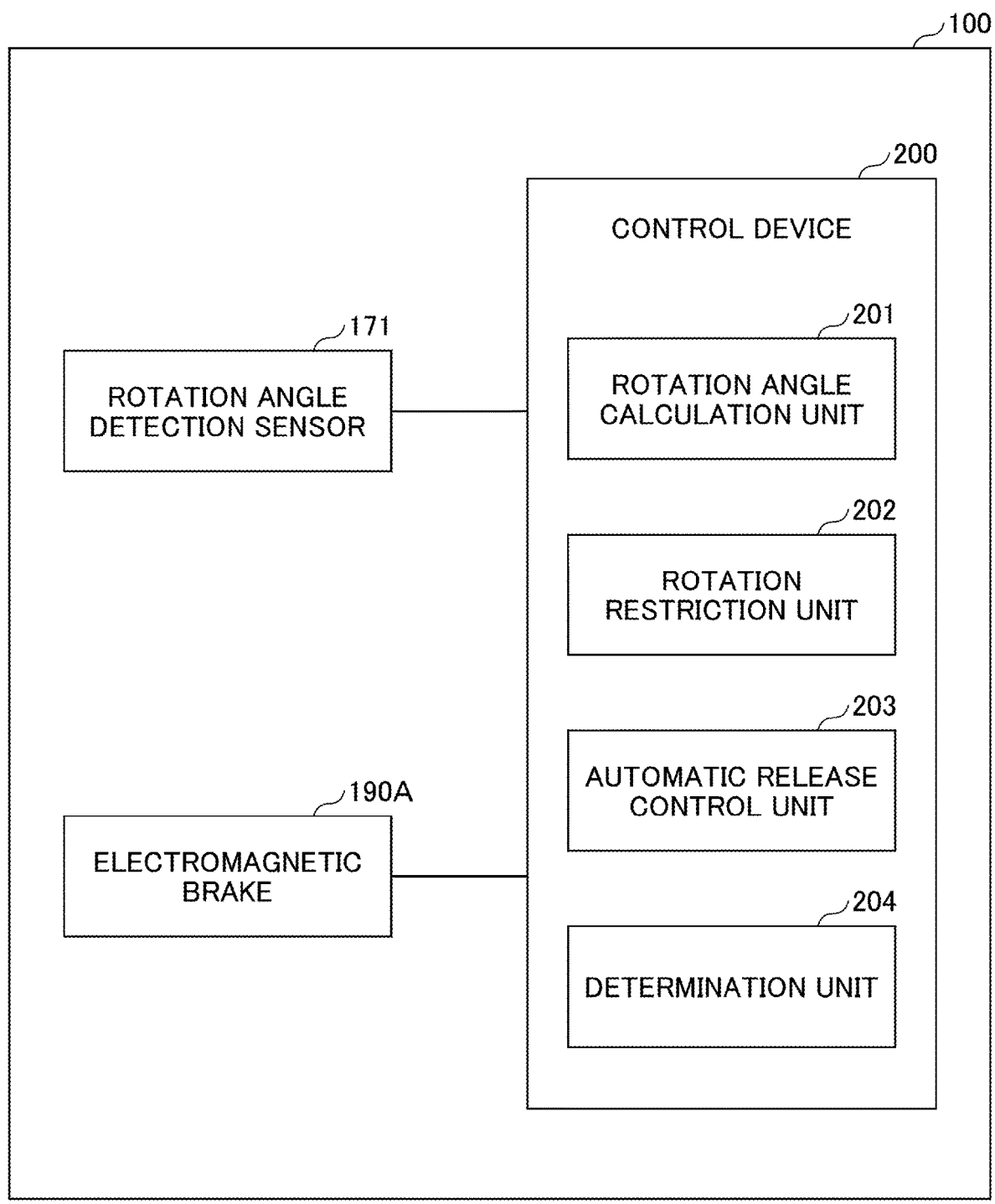
FIG. 9 is a diagram illustrating an electrical configuration of the rotary input device according to the embodiment.

FIG. 9 is a diagram illustrating an electrical configuration of the rotary input device 100 according to the embodiment. As illustrated in FIG. 9, the rotary input device 100 includes the rotation angle detection sensor 171, the electromagnetic brake 190A, and the control device 200.

The control device 200 is connected to the rotation angle detection sensor 171 mounted on the substrate 170 and the electromagnetic brake 190A. The control device 200 includes a rotation angle calculation unit 201, a rotation restriction unit 202, an automatic release control unit 203, and a determination unit 204. The rotation restriction unit 202 and the automatic release control unit 203 are examples of a "braking control unit".

The rotation angle calculation unit 201 calculates the rotation angle of the rotary cylindrical body 120 as the rotation angle of the dial portion 112 using the rotation angle indicated by a detection signal of the rotation angle detection sensor 171 and gear ratios corresponding to the number of teeth of the internal gear 123 of the rotary cylindrical body 120, the number of teeth of each of the three planetary gears 142, and the number of teeth of the sun gear 141.

The determination unit 204 calculates and determines the current shift position based on the rotation angle indicated by the detection signal of the rotation angle detection sensor 171 or the rotation angle of the dial portion 112 calculated by the rotation angle calculation unit 201.

When the rotation restriction unit 202 determines that the predetermined lock condition is satisfied based on the determination result of the current shift position calculated by the determination unit 204 (for example, when the shift position is set to "P" and the brake pedal is not depressed, or when the rotation operation for switching the shift position to "R" is performed in a state where the vehicle is moving forward), the rotation restriction unit 202 controls the electromagnetic brake 190A to be energized, thereby restricting the rotation of the dial portion 112.

When it is determined that the predetermined unlock condition is satisfied based on the determination result of the current shift position calculated by the determination unit 204 (for example, when the shift position is set to "P" and the brake pedal is depressed or when rotation of the dial portion 112 in the direction opposite to the over rotation direction is detected), the automatic release control unit 203 performs control to release energization of the electromagnetic brake 190A to release restriction of rotation of the dial portion 112.

The control device 200 is configured to include a central processing unit (CPU), a read only memory (ROM), a random access memory (RAM), and the like. Each function of the control device 200 described above is realized, for example, by the CPU executing a program stored in the ROM in the control device 200.

(Configuration of Electromagnetic Brake Unit 190)

Figure 10:
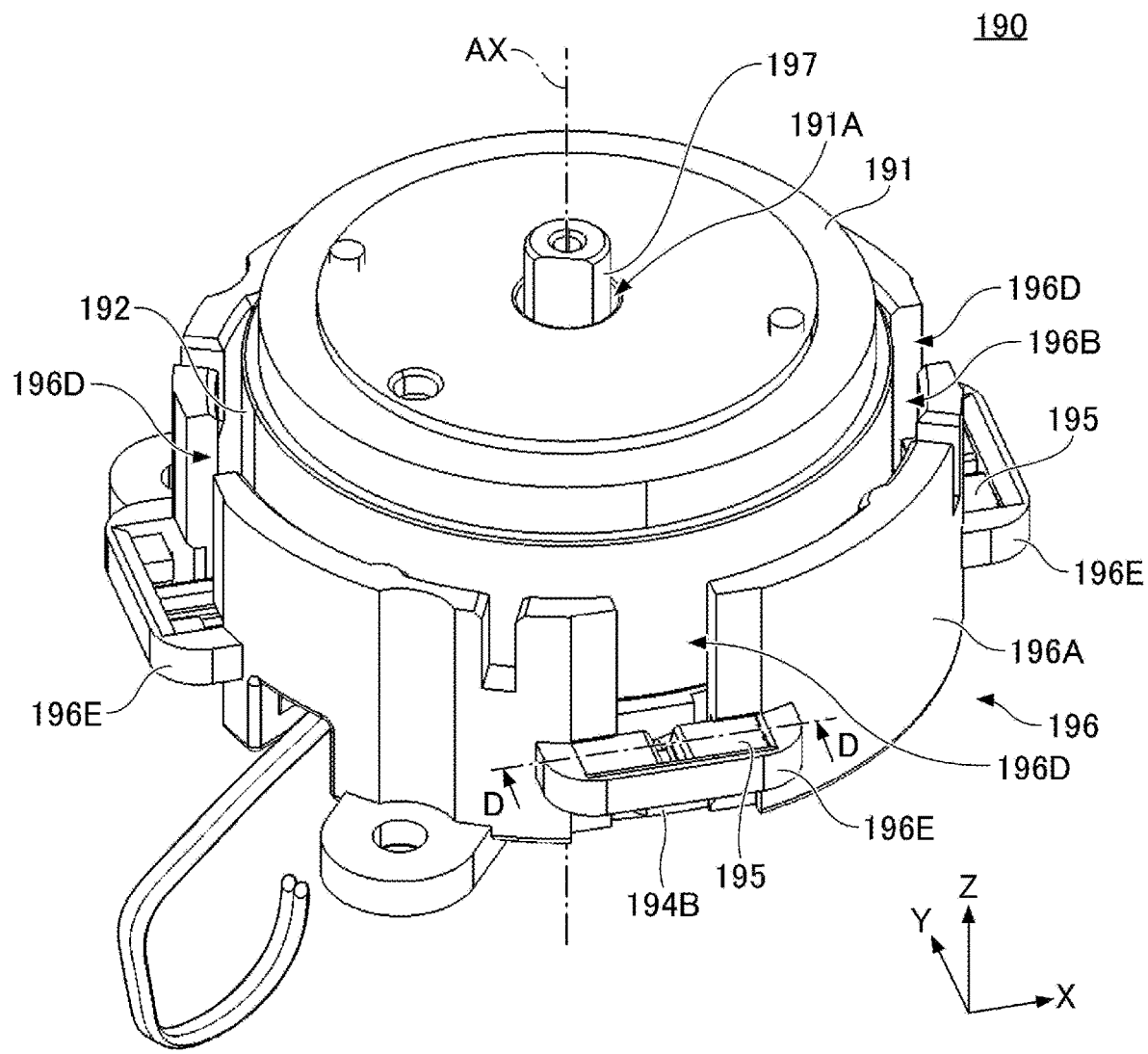
FIG. 10 is an external perspective view of the electromagnetic brake unit according to the embodiment.
Figure 11:
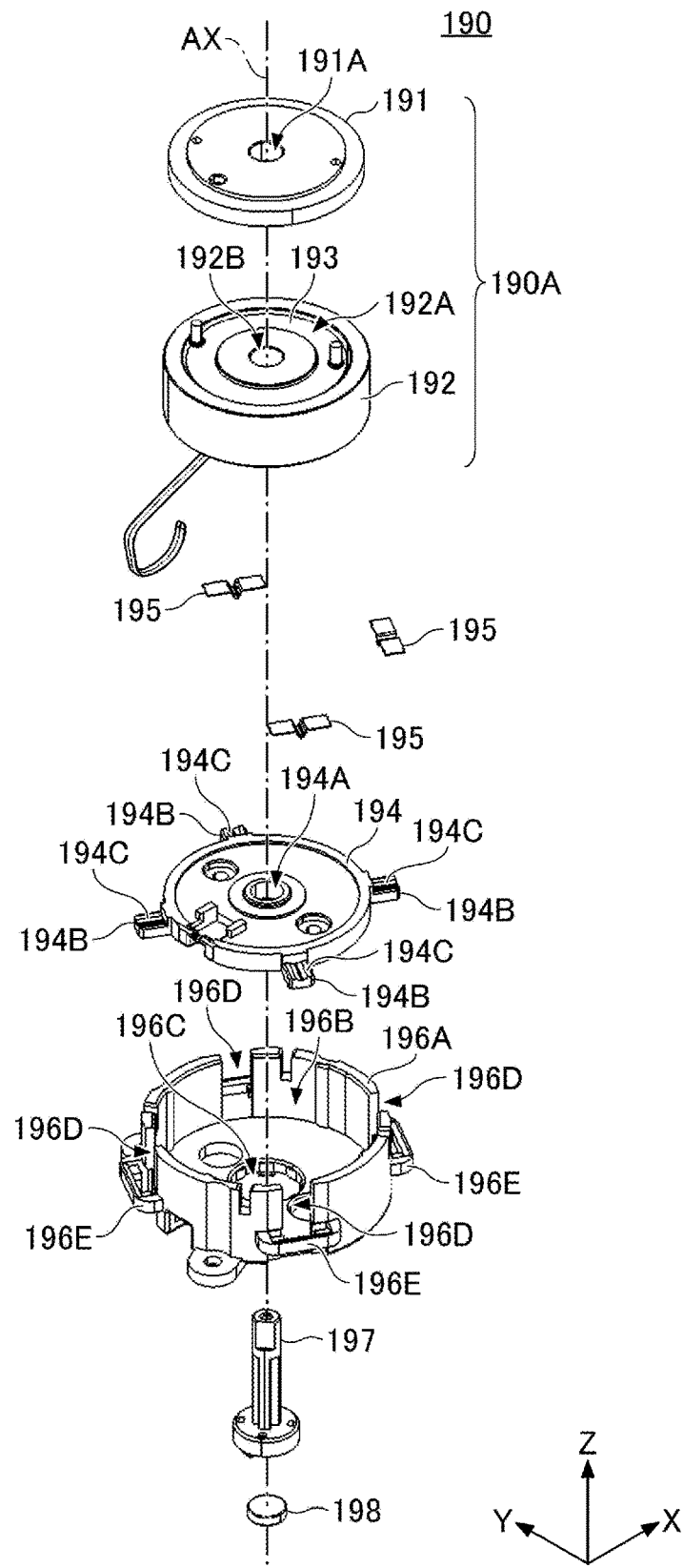
FIG. 11 is an exploded perspective view of the electromagnetic brake unit according to the embodiment.

FIG. 10 is an external perspective view of the electromagnetic brake unit 190 according to the embodiment. FIG. 11 is an exploded perspective view of the electromagnetic brake unit 190 according to the embodiment. As illustrated in FIG. 10 and FIG. 11, the electromagnetic brake unit 190 includes the electromagnetic brake 190A, a yoke holding member 194, three plate springs 195, a yoke opposing member 196, the rotating shaft member 197, and the magnet 198.

Although the yoke holding member 194 is provided separately from the yoke 192 in the embodiment, the yoke holding member 194 may be provided integrally with the yoke 192 to reduce the number of components and the number of assembling steps.

Furthermore, although the yoke opposing member 196 is provided separately from the case 150 in the embodiment, the yoke opposing member 196 may be provided integrally with the case 150 to reduce the number of components and the number of assembling steps.

The electromagnetic brake 190A includes the armature 191, the yoke 192, and a coil 193.

The armature 191 is a disk-shaped member disposed at the uppermost portion of the electromagnetic brake unit 190. The armature 191 is screwed and fixed to the ceiling surface in the cylinder of the sun gear base 143 of the planetary gear mechanism 140. Accordingly, the armature 191 can rotate integrally with the sun gear 141 and the sun gear base 143 of the planetary gear mechanism 140. For example, the armature 191 is made of a magnetic material (for example, iron) so as to be attracted by the magnetic force generated by the electromagnetic brake 190A. A through hole 191A penetrating the armature 191 in the vertical direction is formed at the center of the armature 191 (on the rotation center shaft AX). The rotating shaft member 197 is inserted into the through hole 191A.

The yoke 192 is a columnar member disposed below the armature 191. The yoke 192 is formed with a recess portion 192A having a cylindrical shape recessed downward from the upper surface of the yoke 192. A through hole 192B penetrating the yoke 192 in the vertical direction is formed at the center of the yoke 192 (on the rotation center shaft AX). The rotating shaft member 197 is inserted into the through hole 192B. The yoke 192 is formed of a magnetic material (for example, iron).

The coil 193 is formed in a cylindrical shape by winding an electric wire in multiple layers at the recess portion 192A of the yoke 192.

The electromagnetic brake 190A generates an electromagnetic force when the coil 193 is energized. The electromagnetic brake 190A attracts the armature 191 to the yoke 192 by the electromagnetic force when the coil 193 is energized, increases the load in the rotational direction of the armature 191, and brakes the rotation of the sun gear 141 rotating integrally with the armature 191, thereby braking the rotation of the dial portion 112 and the rotary cylindrical body 120 rotating in conjunction with the sun gear 141.

The yoke holding member 194 is a resin disk-shaped member that holds the yoke 192 by being screwed and fixed to the bottom surface of the yoke 192. A through hole 194A penetrating the yoke holding member 194 in the vertical direction is formed at the center of the yoke holding member 194 (on the rotation center shaft AX). The rotating shaft member 197 is inserted into the through hole 194A. While holding the yoke 192, the yoke holding member 194 is disposed together with the yoke 192 in a space 196B surrounded by an outer peripheral wall portion 196A of the yoke opposing member 196 so as to be rotatable about the rotating shaft member 197. On the outer peripheral side surface of the yoke holding member 194, four protruding portions 194B protruding outward in the radial direction are provided at intervals of 90 degrees. On the upper surface of each of the four protruding portions 194B, a cam surface 194C is formed.

Each of the three plate springs 195 is a strip-shaped elastic member made of metal. Each of the three plate springs 195 is disposed horizontally with respect to the XY plane outside an opening 196D of the yoke opposing member 196. Each of the three plate springs 195 is held by the holding portion 196E of the yoke opposing member 196. Each of the three plate springs 195 presses the corresponding cam surface 194C, disposed on the lower side of the spring 195, of the protruding portion 194B of the yoke holding member 194.

The yoke opposing member 196 is a resin member having a cylindrical shape with an open upper portion and a closed lower portion. The yoke opposing member 196 is screwed and fixed to the upper surface 170A of the substrate 170. The yoke opposing member 196 has the cylindrical outer peripheral wall portion 196A. The inside diameter of the outer peripheral wall portion 196A is larger than the outside diameters of the yoke 192 and the yoke holding member 194. Thus, the yoke opposing member 196 can rotatably support the yoke 192 and the yoke holding member 194 in the space 196B surrounded by the outer peripheral wall portion 196A. A through hole 196C penetrating the yoke opposing member 196 in the vertical direction is formed at the center (on the rotational axis AX) of the yoke opposing member 196 (the inner bottom surface of the space 196B). The rotating shaft member 197 that rotatably supports the yoke 192 and the yoke holding member 194 is inserted into the through hole 196C.

The four openings 196D are formed at intervals of 90 degrees in the outer peripheral wall portion 196A of the yoke opposing member 196. In each opening 196D, the protruding portion 194B of the yoke holding member 194 is disposed.

The yoke opposing member 196 has four holding portions 196E provided for the respective four openings 196D. Each of the holding portions 196E is provided so as to protrude outward from the corresponding opening 196D in the radial direction. Each of the holding portions 196E holds the plate spring 195 in a horizontal state where the plate spring is in contact with the cam surface 194C.

The rotating shaft member 197 is a substantially round bar-shaped member extending in the vertical direction on the rotation center axis AX. The rotating shaft member 197 passes through the yoke opposing member 196, the yoke holding member 194, the yoke 192, and the armature 191. The upper end portion of the rotating shaft member 197 is fitted into the through hole 141A of the sun gear 141. Thus, the rotating shaft member 197 rotates integrally with the sun gear 141 about the rotation center axis AX. The rotating shaft member 197 rotatably supports the yoke holding member 194 and the yoke 192.

The magnet 198 is disposed on the bottom surface of the rotating shaft member 197 so as to face the rotation angle detection sensor 171. Thus, the magnet 198 enables the rotation angle detection sensor 171 to detect the rotation angle of the rotating shaft member 197.

(Configuration of Elastic Mechanism 190B)

Figure 12:
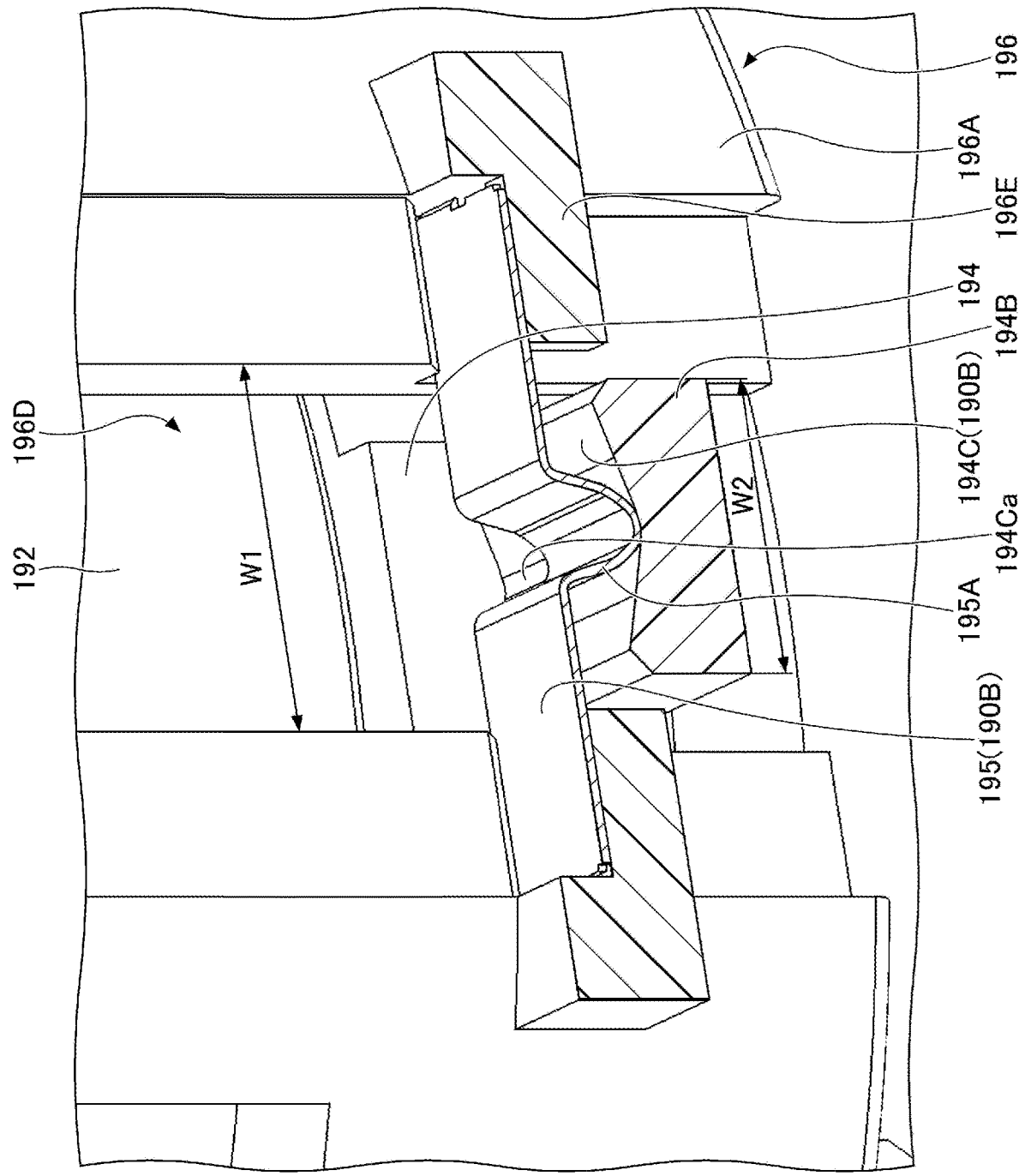
FIG. 12 is a partially enlarged view of a cross-sectional view taken along the line D-D illustrating the configuration of the elastic mechanism included in the rotary input device according to the embodiment.

FIG. 12 is a partially enlarged view of a cross-sectional view taken along the line D-D (see FIG. 10) illustrating the configuration of an elastic mechanism 190B included in the rotary input device 100 according to the embodiment. The elastic mechanism 190B includes the cam surfaces 194C provided on the yoke holding member 194 and the plate springs 195 provided on the yoke opposing member 196.

As illustrated in FIG. 12, the opening 196D formed in the outer peripheral wall portion 196A of the yoke opposing member 196 has a width W1 in a direction orthogonal to the radial direction of the yoke opposing member 196. As illustrated in FIG. 12, the width W1 is greater than a width W2 of the protruding portion 194B of the yoke holding member 194. Thus, the yoke holding member 194 and the yoke 192 are rotatable by a predetermined angle in both the clockwise direction and the counterclockwise direction until the protruding portion 194B of the yoke holding member 194 comes into contact with the inner edge of the opening 196D. The rotation angle corresponding to the distance of (W1−W2)÷2 is an example of the "predetermined angle at which the yoke is rotatably held".

As illustrated in FIG. 12, the cam surface 194C is formed on the upper surface of the protruding portion 194B of the yoke holding member 194. The cam surface 194C has a V-shaped recess with the lowest position in the center in the width direction.

On the upper side of the cam surface 194C, the plate spring 195 is disposed horizontally with respect to the XY direction. The plate spring 195 is a strip-shaped elastic member made of metal extending in the direction orthogonal to the radial direction of the yoke holding member 194. As illustrated in FIG. 12, both end portions of the plate spring 195 in the extending direction thereof are held by the holding portion 196E of the yoke opposing member 196. Furthermore, as illustrated in FIG. 12, the plate spring 195 has a protrude portion 195A that protrudes downward at the center portion in the extending direction thereof. As illustrated in FIG. 12, the protrude portion 195A presses, with the top portion thereof, the cam surface 194C.

As illustrated in FIG. 12, when the dial portion 112 is not over-rotated, the elastic mechanism 190B configured as described above maintains a state in which the protrude portion 195A of the plate spring 195 is fitted into a central holding portion 194Ca of the cam surface 194C by a pressing force applied to the cam surface 194C from the protrude portion 195A of the plate spring 195. That is, the elastic mechanism 190B holds the yoke 192 and the yoke holding member 194 so as not to be easily rotated with respect to the yoke opposing member 196.

When the over rotation operation in which the rotation operation of the dial portion 112 is continuously performed is performed in a state where the rotation of the dial portion 112 is restricted by the electromagnetic brake 190A, the yoke 192 and the yoke holding member 194 rotate together with the dial portion 112 since the armature 191 is attracted to the yoke 192 by the electromagnetic brake 190A. Accordingly, the protruding portion 194B of the yoke holding member 194 moves rotationally (moves in the circumferential direction) within the opening 196D of the yoke opposing member 196.

At this time, the cam surface 194C of the protruding portion 194B gradually pushes the protrude portion 195A of the plate spring 195 upward by the inclined surfaces composing the V-shape, each of the height positions of the inclined surfaces being gradually increased. Accordingly, the plate spring 195 is elastically deformed to generate a rebounding force, the rebounding force increases a pressing force to the cam surface 194C, and the pressing force presses the inclined surfaces of the cam surface 194C to generate a rotational driving force to the yoke holding member 194 in the direction opposite to the over rotation direction.

By this rotational driving force, the yoke 192 and the yoke holding member 194 rotate in the direction opposite to the over rotation direction when the over rotation operation of the dial portion 112 is released. When the protrude portion 195A of the plate spring 195 is fitted into the central holding portion 194Ca of the cam surface 194C, the yoke holding member 194 stops rotating in the opposite direction and returns to the original state (state in which the elastic mechanism 190B holds the yoke 192 and the yoke holding member 194 so as not to be easily rotated) illustrated in FIG. 12.

When the yoke holding member 194 and the yoke 192 rotate in the direction opposite to the over rotation direction, the dial portion 112 directly connected to the armature 191 rotates in the direction opposite to the over rotation direction. This is because the armature 191 is attracted to the yoke 192 by the electromagnetic brake 190A. When the rotation of the dial portion 112 in the direction opposite to the over rotation direction is detected by the rotation angle detection sensor 171, the automatic release control unit 203 of the control device 200 releases the restriction of the rotation of the dial portion 112 by releasing the energization of the electromagnetic brake 190A.

The rotary input device 100 according to the embodiment includes three elastic mechanisms 190B disposed at equal intervals (90 degrees) along the outer periphery of the yoke 192. The three elastic mechanisms 190B simultaneously perform the series of operations described with reference to FIG. 12. Accordingly, the rotary input device 100 according to the embodiment can provide an equal action (holding and biasing) by the three elastic mechanisms 190B.

Although the configurations of the embodiment of the present disclosure have been described in detail above, the present disclosure is not limited to the embodiment, and various modifications or changes can be made within the scope of the gist of the present disclosure described in the claims.

In the present embodiment, a part (dial portion 112) of the knob 110 is configured to rotate, but the entire knob 110 may be configured to rotate. "Rotation of the knob" in this specification includes both a configuration in which a part of the knob rotates and a configuration in which the entire knob rotates.

In the rotary input device 100 of the embodiment described above, the configuration of the elastic mechanism 190B is also, for example, not limited to the configuration described in the embodiment. For example, the plate spring 195 may be provided on the yoke holding member 194, and the cam surface 194C may be provided on the yoke opposing member 196.

In the above-described embodiment, the plate spring 195 and the cam surface 194C face each other in the vertical direction, for example, but the present disclosure is not limited thereto, and the plate spring 195 and the cam surface 194C may face each other in the radial direction.

Further, for example, although the elastic mechanism is provided between the yoke opposing member 196 and the yoke holding member 194 in the above-described embodiment, the present disclosure is not limited thereto. For example, the elastic mechanism may be provided between the yoke opposing member 196 and the yoke 192 without providing the yoke holding member 194.

Furthermore, for example, in the above-described embodiment, the plate spring 195 is used as the elastic body included in the elastic mechanism 190B, but the present disclosure is not limited thereto, and another elastic body (for example, rubber, a coil spring, or the like) may be used.

EXAMPLES

Hereinafter, examples of the rotary input device 100 according to the embodiment will be described with reference to FIG. 13 to FIG. 17. FIG. 13 is a diagram illustrating various preferred implementation conditions of each example of the rotary input device 100 according to the embodiment.

First, preferable conditions for each of a diameter d of the knob, a rotation pitch angle $\theta 1$ between the knob holding positions, a total rotation angle $\theta 2$ of the knob operation, a number of shift positions N, a number of holding positions A per one turn of the knob (=first integer A), a number of stopping positions B per one turn of the armature (=second integer B), and a speed increase rate between the knob and the armature (=A÷B) alone or in combination will be described.

The condition of the diameter d of the knob 110 is preferable to be at least equal to or larger than 45 mm to safely operate the knob as holding the knob around with the operator's palm.

The condition of the rotation pitch angle $\theta 1$ between the knob holding positions is preferable to be equal to or larger than 20 degrees when the diameter of the knob is equal to or larger than the 45 mm as described above, since there is a possibility of erroneous operation such as exceeding the stopping position when the pitch angle is too small.

The condition of the rotation operation angle $\theta 2$ of the knob is preferable to be less than or equal to 90 degrees to operate the knob 110 only by the motion of the operator's wrist without changing the holding position of the operator's fingers holding the knob 110, when the diameter of the knob is equal to or larger than the 45 mm as described above.

Since the condition of the rotation pitch angle $\theta 1$ between the knob holding positions is preferably equal to or larger than 20 degrees and the total rotation angle $\theta 2$ of the knob operation is preferably less than or equal to 90 degrees as described above, the condition of the number of shift positions N that can be set is preferably less than or equal to 5 (the number of rotation operations that can be selected is up to 4 since 90 degrees÷20=4.25). In this case, the number of shift positions N is preferably set by selecting "4" or "5" due to the shift positions "P", "R", "N", "D", and "S", for example.

When the number of shift positions N to be set is "4", the rotation operation is performed three times at less than or equal to 90 degrees (the total rotation angle $\theta 2$ of the knob operation), so that the rotation angle per operation is less than or equal to 30 degrees (=90 degrees÷3). Accordingly, when N=4, the condition of the rotation pitch angle $\theta 1$ between the knob holding positions is preferably between 20 degrees and 30 degrees, inclusive.

When the number of shift positions N to be set is "5", the rotation operation is performed four times at less than or equal to 90 degrees (the total rotation angle θ2 of the knob operation), so that the rotation angle per operation is less than or equal to 22.5 degrees (=90 degrees÷4). Accordingly, when N="5", the condition of the rotation pitch angle θ1 between the knob holding positions is preferably between 20 degrees or 22.5 degrees, inclusive.

The condition of the number of holding positions A per one turn of the knob (=first integer A) is preferable to be A≥N, since it is desirable that all N positions can be selected for one turn of the knob 110. Furthermore, in order to obtain always the same operation feeling no matter from which position the operator starts the operation when the knob 110 is endlessly rotationally operated, it is preferable that an angle for one rotation (=360 degrees) is equally divided and the operation is repeatedly stopped at the same position set in advance even when the rotation operation is performed endlessly. Specifically, it is preferable that a value (angle) obtained by dividing 360 degrees by the number of holding positions A is an integer A which is an integer or a finite decimal whose digits after the decimal point terminate.

As described above, when the number of shift positions N to be set is "5", the condition of the rotation pitch angle θ1 between the knob holding positions is preferably between 20 degrees and 22.5 degrees, inclusive. Therefore, a preferable value that can be taken as the first integer A is either "18" or "16", and the rotation pitch angle θ1 between the knob holding positions in that case is 20 degrees or 22.5 degrees, respectively.

As described above, when the number of shift positions N to be set is "4", the condition of the rotation pitch angle θ1 between the knob holding positions is preferably between 20 degrees and 30 degrees, inclusive. Therefore, the preferable value that can be taken as the first integer A is any one of "18", "16", "15", and "12", and the rotation pitch angles θ1 between the knob holding positions in that case are 20 degrees, 22.5 degrees, 24 degrees, or 30 degrees, respectively.

For the condition of number of stopping positions B per one turn of the armature (=second integer B), it is preferable that, for reliably and easily determining the shift positions, the armature 191 stops always at a predetermined rotation position no matter from which position the operator starts the operation with respect to the knob 110, and an angular state of the armature 191 detected by the rotation angle detection sensor 171 is any of predetermined angular states, when the knob 110 is endlessly rotationally operated. Since the armature 191 is rotationally driven at an increased speed with respect to the knob 110, the preferable condition for the relationship between the number of holding positions A per one turn of the knob 110 and the number of stopping positions B per one turn of the armature 191 is that the number of holding positions A is larger than the number of stopping positions B (A>B). Since each stopping position of the armature 191 is assigned to each shift position, the preferable condition for the relationship between the number of stopping positions B per one turn of the armature 191 and the number of shift positions N is that the number of stopping positions B is equal to or larger than the number of shift positions N (B≥N). Therefore, the preferable condition for the relationship between the number of holding positions A, the number of stopping positions B, and the number of shift positions N is A>B≥N.

Furthermore, it is preferable that the angle corresponding to one rotation (=360 degrees) is equally divided by the pitch angle between the stopping positions of the armature 191, and that, when the knob 110 is endlessly rotated, the armature 191 is repeatedly stopped at positions set in advance. Specifically, it is preferable that a value (angle) obtained by dividing 360 degrees by the number of stopping positions B is an integer B which is an integer or a finite decimal whose digits after the decimal point terminate. Furthermore, a speed increase rate, which is a value obtained by dividing the first integer A by the second integer B (=A÷B), is preferably equal to or more than 2 times due to the demand for downsizing of the electromagnetic brake, and is preferably equal to or more than 4 times to prevent the knob from slipping if the operator is wearing gloves when the inertia of the armature 191 is too large.

From the above-described preferable conditions, when the number of shift positions N is "5", the preferable value that can be taken as the first integer A is either "18" or "16".

When it is set that A="18", the value of B that satisfies all the above conditions is any one of "5", "6", "8", and "9", and the speed increase rate (=A÷B) in that case is "3.6", "3", "2.25", and "2" times, respectively.

When it is set that A="16", the value of B that satisfies at least one of the above conditions is either "5" or "8", and the speed increase rate (=A÷B) in that case is "3.2" times or "2" times, respectively.

From the above-described preferable conditions, when the number of shift positions N is "4", the preferable value that can be taken as the first integer A is any one of "18", "16", "15", and "12".

When it is set that A="18", the value of B that satisfies all the above conditions is any one of "5", "6", "8", and "9", and the speed increase rate (=A÷B) in that case is "3.6", "3", "2.25", and "2" times, respectively.

When it is set that A="16", the value of B that satisfies at least one of the above conditions is any one of "4", "5", and "8", and the speed increase rate (=A÷B) in that case is "4", "3.2", and "2" times, respectively.

When it is set that A="15", the value of B that satisfies at least one of the above conditions is any one of "4", "5", and "6", and the speed increase rate (=A÷B) in that case is "3.75", "3", and "2.5" times, respectively.

When it is set that A="12", the value of B that satisfies at least one of the above conditions is any one of "4", "5", and "6", and the speed increase rate (=A÷B) in that case is "3", "2.4", and "2" times, respectively.

FIG. 13 illustrates the above-mentioned various preferred implementation conditions.

First Example

Figure 14:
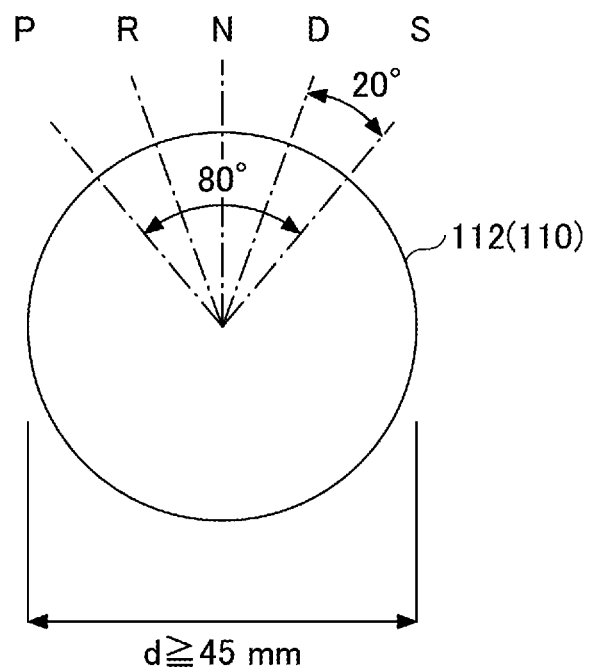
FIG. 14 is a view schematically illustrating shift positions of the rotary input device according to a first example.

FIG. 14 is a diagram schematically illustrating shift positions of the rotary input device 100 according to a first example. As illustrated in FIG. 14, in the first example, the predetermined shift positions at which the knob 110 (dial portion 112) is held are "P", "R", "N", "D", and "S". That is, in the first example, the number of predetermined shift positions at which the knob 110 (dial portion 112) is held N is "5".

As illustrated in FIG. 14, in the first example, the rotation pitch angle θ1 between the holding positions of the knob 110 (dial portion 112) at the time of switching the predetermined shift positions is set to "20 degrees" which is an angle obtained by dividing 360 degrees by the first integer A (where A≥N) which is the number of holding positions per turn of the knob 110. That is, in the first example, the first integer A is "18".

As illustrated in FIG. 14, in the first example, the rotation operation angle θ2 of the knob 110 (dial portion 112)

required for switching the N shift positions is "80 degrees" that satisfies the condition of "less than or equal to 90 degrees".

In the first example, the rotation pitch angle of the armature 191 at the time of switching the predetermined shift positions is set to an angle obtained by dividing 360 degrees by the second integer B (where A>B≥N) which is the number of stopping positions per turn of the armature 191. Moreover, in the first example, as illustrated in FIG. 13, the second integer B is set to any one of "5", "6", "8", and "9".

As illustrated in FIG. 14, in the first example, the diameter d of the knob 110 (dial portion 112) is equal to or larger than the 45 mm.

As illustrated in FIG. 13, in the first example, the speed increase rate by the planetary gear mechanism 140 (speed increase mechanism) obtained by dividing the first integer A by the second integer B is "3.6", "3", "2.25", or "2", and all of which satisfy the condition of "between 2 and 4, inclusive".

An embodiment in which the number of shift positions N is set to "5", the first integer A is set to "18", and the second integer B is set to "5" will be described in more detail as a representative example, among other various conditions for the first example.

Figure 15:
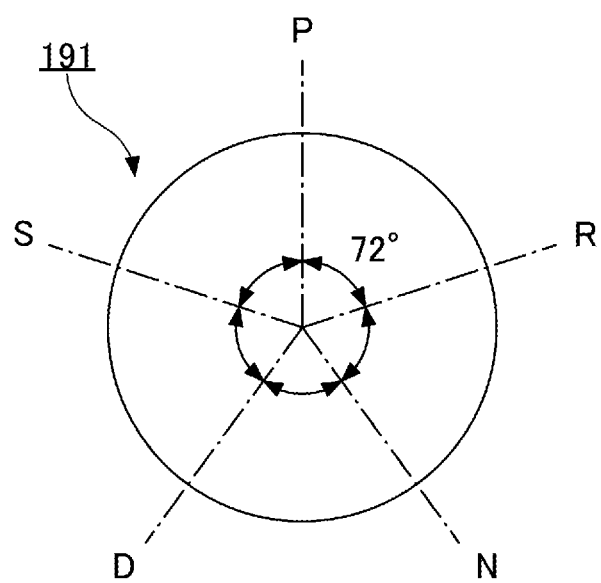
FIG. 15 is a schematic diagram illustrating a rotation state of an armature included in the rotary input device according to the first example.

FIG. 15 is a schematic diagram illustrating a rotation state of the armature 191 included in the rotary input device 100 according to the first example. As illustrated in FIG. 15, since the second integer B is "5", the armature 191 is set to be able to stop at five stopping positions provided every 72 degrees. Furthermore, as illustrated in FIG. 15, since the number of shift positions N is "5", for example, the five shift positions of "P", "R", "N", "D", and "S" are assigned to the respective stopping positions.

In this example, setting the first integer A to "18" and the second integer B to "5" means that increase in the speed of the rotation from the knob 110 to "3.6" times is performed so that the rotation pitch angle between the stopping positions of the armature 191 corresponding to 20 degrees (=360 degrees÷18) of the rotation pitch angle between the holding positions of the knob 110 becomes 72 degrees (=360 degrees÷5). Specifically, the number of teeth of the internal gear 123 that rotates integrally with the knob 110 is set to 3.6 times the number of teeth of the sun gear 141 that rotates integrally with the armature 191. Although not illustrated in the drawings, for example, if the number of teeth of the internal gear 123 is set to 72 teeth and the number of teeth of the sun gear 141 is set to 20 teeth, a "3.6" (=72 teeth÷20 teeth) times speed increase can be achieved.

As described above, among the various conditions for the first example, the embodiment in which the number of shift positions N is set to "5", the first integer A is set to "18", and the second integer B is set to "5" has been described in detail as the representative example. However, since explanation for individual combinations of preferable conditions in other embodiments and other examples is the same as the above explanation, detailed explanation is omitted below. Another preferable speed increase rate can also be set to a desired condition, in the same manner as above, by setting the number of teeth of the internal gear 123 and the number of teeth of the sun gear 141 in accordance with the speed increase rate. Examples of the "desired speed increase rate" (=number of teeth of internal gear 123÷number of teeth of sun gear 141) are "3.75" (=75 teeth÷teeth), "3.2" (=64 teeth÷20 teeth), "3" (=60 teeth÷20 teeth), "2.5" (=50 teeth÷20 teeth), "2.4" (=48 teeth÷20 teeth), "2.25" (=teeth÷20 teeth), and "2" (=40 teeth÷20 teeth) times. It is preferable to select an optimum number of teeth in accordance with the size of the device or the like while maintaining a desired rate.

Note that FIG. 8 illustrates an example in which the number of teeth of the internal gear 123 is 64 teeth, the number of teeth of the sun gear 141 is 20 teeth, and the speed increase rate is "3.2" (=64 teeth÷20 teeth) times as described above.

Second Example

Figure 16:
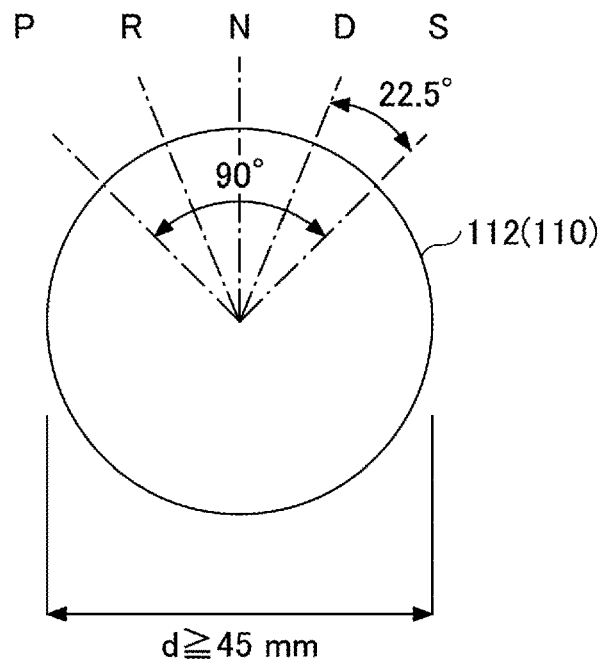
FIG. 16 is a diagram schematically illustrating shift positions of the rotary input device according to a second example.

FIG. 16 is a diagram schematically illustrating shift positions of the rotary input device 100 according to a second example. As illustrated in FIG. 16, in the second example, the predetermined shift positions at which the knob 110 (dial portion 112) is held are "P", "R", "N", "D", and "S". That is, in the second example, the number of predetermined shift positions at which the knob 110 (dial portion 112) is held N is "5".

As illustrated in FIG. 16, in the second example, the rotation pitch angle θ1 between the holding positions of the knob 110 (dial portion 112) at the time of switching the predetermined shift positions is set to "22.5 degrees" which is an angle obtained by dividing 360 degrees by the first integer A (where A≥N) which is the number of holding positions per turn of the knob 110. That is, in the second example, the first integer A is "16".

As illustrated in FIG. 16, in the second example, the rotation operation angle θ2 of the knob 110 (dial portion 112) required for switching the N shift positions is "90 degrees" that satisfies the condition of "less than or equal to 90 degrees".

In the second example, the rotation pitch angle of the armature 191 at the time of switching the predetermined shift positions is set to an angle obtained by dividing 360 degrees by the second integer B (where A>B≥N) which is the number of stopping positions per turn of the armature 191. Moreover, in the second example, as illustrated in FIG. 13, the second integer B is set to either "5" or "8".

As illustrated in FIG. 16, in the second example, the diameter d of the knob 110 (dial portion 112) is equal to or larger than the mm.

As illustrated in FIG. 13, in the second example, the speed increase rate by the planetary gear mechanism 140 (speed increase mechanism) obtained by dividing the first integer A by the second integer B is "3.2" or "2", and all of which satisfy the condition of "between 2 and 4, inclusive".

Third Example

Figure 17:
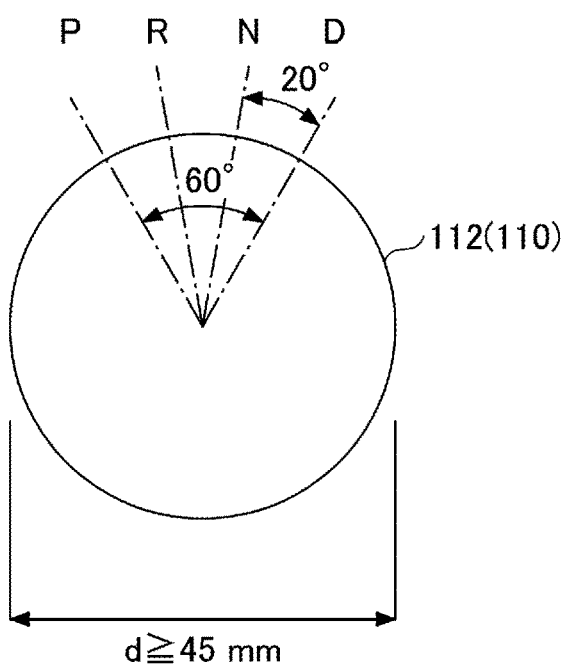
FIG. 17 is a view schematically illustrating shift positions of the rotary input device according to a third example.

FIG. 17 is a diagram schematically illustrating shift positions of the rotary input device 100 according to a third example. As illustrated in FIG. 17, in the third example, the predetermined shift positions at which the knob 110 (dial portion 112) is held are "P", "R", "N", and "D". That is, in the third example, the number of predetermined shift positions at which the knob 110 (dial portion 112) is held N is "4".

As illustrated in FIG. 17, in the third example, the rotation pitch angle θ1 between the holding positions of the knob 110 (dial portion 112) at the time of switching the predetermined shift positions is set to "20 degrees" which is an angle obtained by dividing 360 degrees by the first integer A (where A≥N) which is the number of holding positions per turn of the knob 110. That is, in the third example, the first integer A is "18".

As illustrated in FIG. 17, in the third example, the rotation operation angle θ2 of the knob 110 (dial portion 112) required for switching the N shift positions is "60 degrees" that satisfies the condition of "less than or equal to 90 degrees".

In the third example, the rotation pitch angle of the armature 191 at the time of switching the predetermined shift positions is set to an angle obtained by dividing 360 degrees by the second integer B (where A>B≥N) which is the number of stopping positions per turn of the armature 191. Moreover, in the third example, as illustrated in FIG. 13, the second integer B is set to any one of "5", "6", "8", and "9".

As illustrated in FIG. 17, in the third example, the diameter d of the knob 110 (dial portion 112) is equal to or larger than the 45 mm.

Furthermore, as illustrated in FIG. 13, in the third example, the speed increase rate by the planetary gear mechanism 140 (speed increase mechanism) obtained by dividing the first integer A by the second integer B is "3.6", "3", "2.25", or "2", and all of which satisfy the condition of "between 2 and 4, inclusive".

Fourth Example

Figure 18:
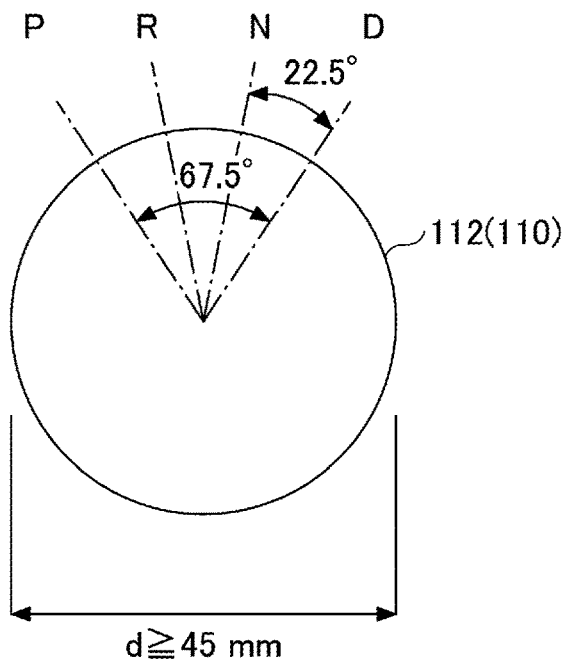
FIG. 18 is a diagram schematically illustrating shift positions of the rotary input device according to a fourth example.

FIG. 18 is a diagram schematically illustrating shift positions of the rotary input device 100 according to a fourth example. As illustrated in FIG. 18, in the fourth example, the predetermined shift positions at which the knob 110 (dial portion 112) is held are "P", "R", "N", and "D". That is, in the third example, the number of predetermined shift positions at which the knob 110 (dial portion 112) is held N is "4".

As illustrated in FIG. 18, in the fourth example, the rotation pitch angle θ1 between the holding positions of the knob 110 (dial portion 112) at the time of switching the predetermined shift positions is set to "22.5 degrees" which is an angle obtained by dividing 360 degrees by the first integer A (where A≥N) which is the number of holding positions per turn of the knob 110. That is, in the fourth example, the first integer A is "16".

As illustrated in FIG. 18, in the fourth example, the rotation operation angle θ2 of the knob 110 (dial portion 112) required for switching the N shift positions is "67.5 degrees" that satisfies the condition of "less than or equal to 90 degrees".

In the fourth example, the rotation pitch angle of the armature 191 at the time of switching the predetermined shift positions is set to an angle obtained by dividing 360 degrees by the second integer B (where A>B≥N) which is the number of stopping positions per turn of the armature 191. Moreover, in the fourth example, as illustrated in FIG. 13, the second integer B is set to any one of "4", "5", and "8".

As illustrated in FIG. 18, in the fourth example, the diameter d of the knob 110 (dial portion 112) is equal to or larger than the 45 mm.

Further, as illustrated in FIG. 13, in the fourth example, the speed increase rate by the planetary gear mechanism 140 (speed increase mechanism) obtained by dividing the first integer A by the second integer B is "4", "3.2", or "2", and all of which satisfy the condition of "between 2 and 4, inclusive".

Fifth Example

Figure 19:
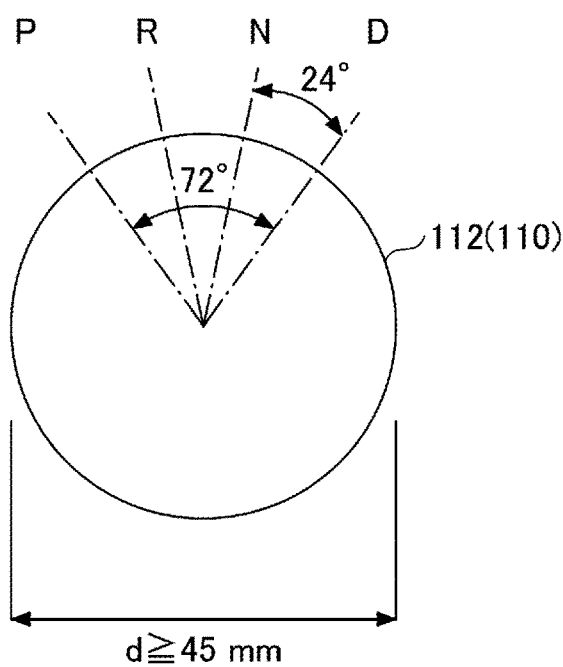
FIG. 19 is a view schematically illustrating shift positions of the rotary input device according to a fifth example.

FIG. 19 is a diagram schematically illustrating shift positions of the rotary input device 100 according to a fifth example. As illustrated in FIG. 19, in the fifth example, the predetermined shift positions at which the knob 110 (dial portion 112) is held are "P", "R", "N", and "D". That is, in the third example, the number of predetermined shift positions at which the knob 110 (dial portion 112) is held N is "4".

As illustrated in FIG. 19, in the fifth example, the rotation pitch angle θ1 between the holding positions of the knob 110 (dial portion 112) at the time of switching the predetermined shift positions is set to "24 degrees" which is an angle obtained by dividing 360 degrees by the first integer A (where A≥N) which is the number of holding positions per turn of the knob 110. That is, in the fifth example, the first integer A is "15".

Furthermore, as illustrated in FIG. 19, in the fifth example, the rotation operation angle θ2 of the knob 110 (dial portion 112) required for switching the N shift positions is "72 degrees" that satisfies the condition of "less than or equal to 90 degrees".

In the fifth example, the rotation pitch angle of the armature 191 at the time of switching the predetermined shift positions is set to an angle obtained by dividing 360 degrees by the second integer B (where A>B≥N) which is the number of stopping positions per turn of the armature 191. Moreover, in the fifth example, as illustrated in FIG. 13, the second integer B is set to any one of "4", "5", and "6".

As illustrated in FIG. 19, in the fifth example, the diameter d of the knob 110 (dial portion 112) is equal to or larger than the 45 mm.

As illustrated in FIG. 13, in the fifth example, the speed increase rate by the planetary gear mechanism 140 (speed increase mechanism) obtained by dividing the first integer A by the second integer B is "3.75", "3", or "2.5", and all of which satisfy the condition of "between 2 and 4, inclusive".

Sixth Example

Figure 20:
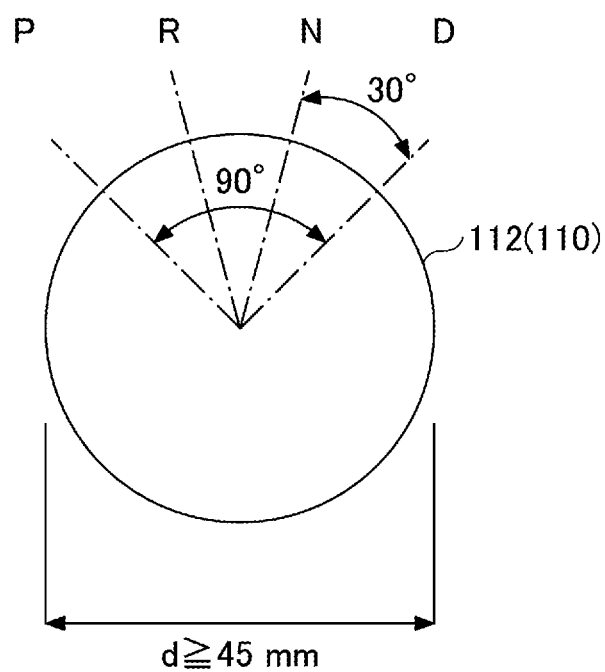
FIG. 20 is a view schematically illustrating shift positions of the rotary input device according to a sixth example.

FIG. 20 is a diagram schematically illustrating shift positions of the rotary input device 100 according to a sixth example. As illustrated in FIG. 20, in the sixth example, the predetermined shift positions at which the knob 110 (dial portion 112) is held are "P", "R", "N", and "D". That is, in the sixth example, the number of predetermined shift positions at which the knob 110 (dial portion 112) is held N is "4".

As illustrated in FIG. 20, in the sixth example, the rotation pitch angle θ1 between the holding positions of the knob 110 (dial portion 112) at the time of switching the predetermined shift positions is set to "30 degrees" which is an angle obtained by dividing 360 degrees by the first integer A (where A≥N) which is the number of holding positions per turn of the knob 110. That is, in the sixth example, the first integer A is "12".

As illustrated in FIG. 20, in the sixth example, the rotation operation angle θ2 of the knob 110 (dial portion 112) required for switching the N shift positions is "90 degrees" that satisfies the condition of "less than or equal to 90 degrees".

In the sixth example, the rotation pitch angle of the armature 191 at the time of switching the predetermined shift positions is set to an angle obtained by dividing 360 degrees by the second integer B (where A>B≥N) which is the number of stopping positions per turn of the armature 191. Moreover, in the sixth example, as illustrated in FIG. 13, the second integer B is set to any one of "4", "5", and "6".

As illustrated in FIG. 20, in the sixth example, the diameter d of the knob 110 (dial portion 112) is equal to or larger than the 45 mm.

As illustrated in FIG. 13, in the sixth example, the speed increase rate by the planetary gear mechanism 140 (speed increase mechanism) obtained by dividing the first integer A by the second integer B is "3", "2.4", or "2", and all of which satisfy the condition of "between 2 and 4, inclusive".

As described above, in any of the rotary input devices 100 according to the first example to the sixth example, the rotation pitch angle of the knob 110 (dial portion 112) at the time of switching the predetermined shift positions is set to an angle obtained by dividing 360 degrees by the first integer A (where A≥N) which is the number of stopping positions per turn of the knob 110, and the rotation pitch angle of the armature 191 at the time of switching the predetermined shift positions is set to an angle obtained by dividing 360 degrees by the second integer B (where A>B≥N) which is the number of stopping positions per turn of the armature 191.

Accordingly, in the rotary input devices 100 according to the first example to the sixth example, since the rotation pitch angle θ1 of the knob 110 (dial portion 112) is always constant even after any rotation operation is performed, it is possible to always obtain a constant operation feeling in the rotation operation of the knob 110 (dial portion 112). In the rotary input devices 100 according to the first example to the sixth example, even when the system power supply is once switched off after the shift position is switched to another shift position other than the predetermined shift position by the rotation operation of the knob 110 (dial portion 112), the rotation operation of the knob 110 (dial portion 112) can be easily performed from the predetermined shift position by the electronic control by the control device 200.

In the rotary input devices 100 according to the first example to the sixth example, the rotation pitch angle of the armature 191 is always constant even after any rotation operation is performed, and there are at least N stopping positions corresponding to N shift positions in one rotation. Therefore, the current shift position can be determined by detecting the current stopping position of the armature.

Furthermore, in the rotary input devices 100 according to the first example to the sixth example, the rotation angle detection sensor 171 detects the rotation angle of the armature 191 after speed increase by the planetary gear mechanism 140. Therefore, the control device 200 can control the electromagnetic brake 190A at more accurate timing.

In any of the rotary input devices 100 according to the first example to the sixth example, the diameter d of the knob 110 (dial portion 112) is equal to or larger than the 45 mm.

Accordingly, in the rotary input devices 100 according to the first example to the sixth example, the knob 110 (dial portion 112) is easily gripped, and it is possible to improve the ease of the rotation operation of the knob 110.

In any of the rotary input devices 100 according to the first example to the sixth example, the rotation pitch angle θ1 of the knob 110 (dial portion 112) is equal to or larger than degrees.

Accordingly, the rotary input devices 100 according to the first example to the sixth example can suppress an erroneous operation of the rotation operation by the knob 110 (dial portion 112). When the rotation pitch angle θ1 is smaller than 20 degrees, the knob 110 may be erroneously operated to a shift position different from a desired shift position.

In any of the rotary input devices 100 according to the first example to the sixth example, the rotation operation angle θ2 of the knob 110 (dial portion 112) required for switching the N shift positions (that is, the rotation pitch angle×the number of shift positions N−1) is less than or equal to 90 degrees.

Thus, in the rotary input devices 100 according to the first example to the sixth example, the operator can switch the N shift positions without changing the way to grip the knob 110. For example, a general movable range in which the operation can be performed only by the movement of the operator's wrist without changing the way to grip the knob 110 is less than or equal to 90 degrees.

In any of the rotary input devices 100 according to the first example to the sixth example, the speed increase rate (that is, the first integer A=the second integer B) by the planetary gear mechanism 140 (speed increase mechanism) is between 2 and 4, inclusive.

Accordingly, the rotary input devices 100 according to the first example to the sixth example can suppress the occurrence of a problem of the operation feeling in the rotation operation of the knob 110 (dial portion 112). For example, when the speed increase rate by the planetary gear mechanism 140 (speed increase mechanism) is larger than 4, the start of the movement of the knob 110 (dial portion 112) becomes slow due to the influence of the inertia of the armature 191. Especially when the operator is wearing gloves, there is a concern of the knob 110 (dial portion 112) slipping and of not being able to perform a quick operation. Further, for example, when the speed increase rate by the planetary gear mechanism 140 (speed increase mechanism) is larger than 4, due to the influence of the inertia of the armature 191, the restriction of the rotation of the knob 110 (dial portion 112) by the electromagnetic brake 190A is difficult to perform, and the knob 110 (dial portion 112) may not be stopped at a desired stopping position. Furthermore, for example, when the speed increase rate by the planetary gear mechanism 140 (speed increase mechanism) is smaller than 2, the electromagnetic brake 190A which can generate a large brake torque is required, which may make it difficult to reduce the size of the device.

In any of the rotary input devices 100 according to the first example to the sixth example, the "speed increase mechanism" is the planetary gear mechanism 140 including the sun gear 141 provided at the center portion of the mechanism, the planetary gears 142 provided around the sun gear 141, and the internal gear 123. The rotational force of the knob 110 (dial portion 112) is input from the internal gear 123, transmitted to the sun gear 141 via the planetary gears 142 that rotate in place, and output from the sun gear 141 to the armature 191.

Thus, the rotary input devices 100 according to the first example to the sixth example can achieve the "speed increase mechanism" in a relatively small installation space. Therefore, an increase in the size of the device can be suppressed.

In any of the rotary input devices 100 according to the first example to the sixth example, the knob 110 includes the upper surface 111 that does not rotate and the dial portion 112 (outer peripheral portion) that can be rotationally operated.

Accordingly, in the rotary input devices 100 according to the first example to the sixth example, since the upper surface 111 does not rotate, it is possible to arrange a directional design on the upper surface 111 or to prevent a component such as wiring connected to the upper surface 111 from being twisted, for example.

According to one embodiment, it is possible to suppress the occurrence of various problems associated with the rotation operation of the knob.

What is claimed is:

1. A rotary shifter comprising:
   a knob that is rotationally operable;
   a cam mechanism configured to hold the knob at holding positions corresponding to respective predetermined shift positions;
   an electromagnetic brake including a yoke and an armature rotatable together with the knob via a speed increase mechanism, the electromagnetic brake being configured to restrict rotation of the armature and the knob by the yoke attracting the armature when energized; and
   a hardware processor configured to
   detect a rotation angle of the armature,
   determine a predetermined shift position at which the knob is held among the predetermined shift positions whose number is N, based on the detected rotation angle of the armature, and
   control operation of the electromagnetic brake based on a determination result,
   wherein a rotation pitch angle between the holding positions of the knob at a time of switching the predetermined shift positions is set to an angle obtained by dividing 360 degrees by a first integer A (A≥N), and
   wherein a rotation pitch angle between stopping positions of the armature corresponding to the holding positions at a time of switching the predetermined shift positions is set to an angle obtained by dividing 360 degrees by a second integer B (A>B≥N).

2. The rotary shifter according to claim 1, wherein a diameter of the knob is equal to or larger than 45 mm.

3. The rotary shifter according to claim 2, wherein the rotation pitch angle of the knob is equal to or larger than 20 degrees.

4. The rotary shifter according to claim 2, wherein a rotation angle of the knob required for switching the N shift positions is less than or equal to 90 degrees.

5. The rotary shifter according to claim 1, wherein a rate of speed increase by the speed increase mechanism is between 2 and 4, inclusive.

6. The rotary shifter according to claim 1,
   wherein the speed increase mechanism is a planetary gear mechanism, the planetary gear mechanism including a sun gear provided at a central portion of the planetary gear mechanism, planetary gears provided around the sun gear, and an internal gear, and
   wherein the speed increase mechanism is configured to input a rotational force of the knob from the internal gear, transmit the rotational force to the sun gear via the planetary gears that rotate in place, and output the rotational force from the sun gear to the armature.

7. The rotary shifter according to claim 1,
   wherein the knob includes an upper surface that does not rotate and an outer periphery portion that is rotationally operable.

8. The rotary shifter according to claim 1,
   wherein the first integer A is 18, and
   wherein the second integer B is any one of 5, 6, 8, and 9.

9. The rotary shifter according to claim 1,
   wherein the first integer A is 16, and
   wherein the second integer B is any one of 4, 5, and 8.

10. The rotary shifter according to claim 1,
    wherein the first integer A is 15, and
    wherein the second integer B is any one of 4, 5, and 6.

11. The rotary shifter according to claim 1,
    wherein the first integer A is 12, and
    wherein the second integer B is any one of 4, 5, and 6.

* * * * *